United States Patent
Morita et al.

[11] Patent Number: 5,899,573
[45] Date of Patent: May 4, 1999

[54] ROLLING BEARING UNIT WITH ROTATING SPEED DETECTION DEVICE

[75] Inventors: Kouichi Morita; Hideo Ouchi, both of Fujisawa, Japan

[73] Assignee: NSK Ltd., Tokyo, Japan

[21] Appl. No.: 08/863,909

[22] Filed: May 27, 1997

Related U.S. Application Data

[63] Continuation of application No. 08/513,642, Aug. 10, 1995, abandoned.

[30] Foreign Application Priority Data

| Aug. 11, 1994 | [JP] | Japan | 6-189276 |
| Dec. 8, 1994 | [JP] | Japan | 6-305053 |
| Dec. 8, 1994 | [JP] | Japan | 6-305055 |
| May 31, 1995 | [JP] | Japan | 7-133600 |

[51] Int. Cl.[6] ................................. F16C 19/08
[52] U.S. Cl. ........................... 384/448; 324/174
[58] Field of Search ................... 384/448, 446, 384/544, 512; 324/174

[56] References Cited

U.S. PATENT DOCUMENTS

| 3,500,091 | 3/1970 | Jones . |
| 3,927,339 | 12/1975 | Paul et al. . |
| 5,023,547 | 6/1991 | Pawlak et al. . |
| 5,264,790 | 11/1993 | Moretti et al. ........................ 384/448 |
| 5,296,805 | 3/1994 | Clark et al. . |

FOREIGN PATENT DOCUMENTS

| 0 213 732 | 3/1987 | European Pat. Off. . |
| 0 357 870 | 3/1990 | European Pat. Off. . |
| 0 426 298 | 5/1991 | European Pat. Off. . |
| 0 522 933 | 1/1993 | European Pat. Off. . |
| 0 557 931 | 9/1993 | European Pat. Off. . |
| 2 267 553 | 11/1975 | France . |
| 88 14 620 | 2/1989 | Germany . |

*Primary Examiner*—Lenard A. Footland
*Attorney, Agent, or Firm*—Evenson, McKeown, Edwards & Lenahan, P.L.L.C.

[57] ABSTRACT

In the rolling-bearing unit with rpm detecting device of this invention, there are first and two opposing sections where the sensor is faced to the tone wheel, and the magnetic resistance at these two opposing sections changes at the same time as the rotating ring rotates. These two opposing sections are located in series in the magnetic circuit which includes the stator.

17 Claims, 15 Drawing Sheets

ROLLING BEARING UNIT WITH ROTATING SPEED DETECTION DEVICE

This application is a continuation of application Ser. No. 08/513,642, filed on Aug. 10, 1995, abandoned.

BACKGROUND OF THE INVENTION

The rolling-bearing unit with rotating speed (rpm) detection device of this invention supports a vehicle wheel so that it rotates freely with respect to the suspension, as well as is used for detecting the rpm of the wheel.

DESCRIPTION OF THE RELATED ART

Prior to this invention, rolling-bearing units with rotating speed (rpm) detection device of various construction, which have been used for supporting a vehicle wheel so that it rotates freely with respect to the suspension, as well as detect the rotating speed (rpm) of the wheel in order to control an anti-lock brake system (ABS) or traction control system (TCS), have been known in the art.

All of the rpm detection devices built into rolling-bearing units with rpm detection device as mentioned above have had a tone wheel which rotates with the vehicle wheel, and a sensor which outputs a signal that is proportional to the rpm of the tone wheel.

Various forms of tone wheels and sensors have been used in the past. Of these, a so-called passive-type detection device using a tone wheel made of magnetic material so as to generate a change in voltage in the coil of a sensor as the tone wheel rotates has been widely used because it does not use expensive components.

Also, passive-type rpm detection devices, which use a circular or annular sensor to increase the output of the sensor, such as described in European patent No. 0 426 298 A1 or the HATSUMEI KVOKAI KOKAI Technical Report (Japanese) No. 94-16061, have been used in the past.

FIGS. 14 and 15 show the rolling-bearing unit with rpm detector described in the HATSUMEI KYOKAI KOKAI Technical Report No. 94-16051. Around the outer peripheral surface of the axially outside end portion of the hub 1 (the "outside end" is the and facing toward the outside of the vehicle when assembled, the left side in the figures) there is a flange section 2 for attaching the vehicle wheel, and around the outer peripheral surface of the axially mid-section of the hub 1, there is an inner-ring raceway 3a and step section 4. Moreover, around the outer peripheral surface of the axially inside end portion of the hub 1 there is an inner-ring member 5 that forms an inner-ring raceway 3b around its outer peripheral surface, and that is supported by the hub 1 with its axially outside end in contact with the stepped section 4.

Instead of being formed directly around the outer peripheral surface of the hub 1, the aforementioned inner-ring raceway 3a may also be formed around another inner-ring member (not shown in the figure) that is separate from the hub 1, so that this inner-ring member and the inner-ring member 5 are fitted around the outer peripheral surface of the hub 1.

On the axially inside end portion of the hub 1 there is a male screw section 6 (the "inside end" is the end facing toward the center of the vehicle when assembled, right side in the figures). By fastening a nut 7 around this screw section 6, the aforementioned inner-ring member 5 is attached to a prescribed location around the outer peripheral surface of the hub 1 forming an inner ring assembly.

There is an outer ring member 8 around the hub 1. Around the outer surface of the axially mid-section of the outer-ring member 8, there is an installation section 9 for fastening the outer-ring member 8 to the suspension device.

On the inner peripheral surface of this outer-ring member 8 are outer-ring raceways 10a and 10b that are faced to the aforementioned inner-ring raceways 3a and 3b, respectively. Between both the inner-ring raceways 3a and 3b and outer-ring raceways 10a and 10b are multiple rolling bodies 11 that make it possible for the hub 1 on the inside of the outer-ring member 8 to rotate freely.

In the example shown in the figure, balls are used for the rolling bodies 11, however, for hub units of vehicles carrying heavy loads, tapered rollers may be used as the rolling bodies.

There is a space formed for accommodating the rolling bodies 11 between the inner peripheral surface of the outer-ring member 8 and the outer peripheral surface of the hub 1.

Moreover, there is a sealing ring 12 that is fitted between the inner peripheral surface on the axially outside end of the outer-ring member 8 and the outer peripheral surface of the hub 1, so as to cover the opening on the axially outside end of the space.

On the inside and peripheral of the aforementioned inner-ring member 5, there is a tone wheel 13, whose base (left and in FIGS. 14 and 15) is fitted around a portion axially inward from the inner-ring raceway 3b.

This tone wheel 13 is made of magnetic metal plate such as steel, and is entirely annular or cylindrical. This tone wheel 13 comprises a smaller-diameter section 14, a larger-diameter section 15 and a stepped section 16 that are continuous end concentric with each other.

This kind of tone wheel 13 is fixed to the inner-ring member 5, such that the larger-diameter section 15 is fitted around the outer peripheral surface on the axially inside end portion of the inner-ring member 5, so that the stepped section 16 comes in contact with the edge of the inner-ring member 5. Therefore the smaller-diameter section 14 is supported so that it is concentric with the inner-ring member 5. There are several through-holes 17 formed around this smaller-diameter section 14 at equal intervals in the circumferential direction to form a rotating cutout section. Each of these through-holes 17 are identical and are rectangular shaped to extend in the axial direction (left and right in FIGS. 14 and 15).

The opening on the inside end portion of the outer-ring member 8 is covered by a cover 18 which is made of metal plate, such as stainless steel plate or aluminum alloy plate and so on, and is formed into a cylindrical shape with a bottom using a drawing method etc.

Disposed on the inner peripheral surface of the cylindrical section 19 of this cover 18, is a circular or annular-shaped sensor 20 which is embedded in a synthetic resin mass 21. This sensor 20 comprises a permanent magnet 22, a stator 23 made of magnetic material such as steel plate, and a coil 24. By embedding the permanent magnet 22, stator 23 and coil 24 in the synthetic resin mass 21, the sensor 20 can be made generally annular.

Of these components which make up the sensor 20, the permanent magnet 22 is formed so that it is generally annular (ring shaped) and magnetized so that its magnetic orientation is in the radial direction. The inner peripheral surface of this permanent magnet 22 is faced, through a small clearance or gap 25, to the outer peripheral surface of a base portion of the smaller-diameter section 14 of the tone wheel 13 where the holes 17 are not formed.

The stator 23 is formed so that it is entirely annular and has a substantially J-shaped cross section. The inner peripheral surface on the axially outside end of the radially outer cylindrical section 26 of the stator 23 is very near or comes in contact with the outer peripheral surface of the permanent magnet 22. Moreover, the inner peripheral surface of the radially inner cylindrical section 27 of the stator 23 is faced to a portion of the tone wheel is where the holes 17 are formed. Furthermore, a plurality of multiple stationary notches 28 are formed in the stationary cutout portion around the radially inner cylindrical section 27 of the stator 23, so that they are located around the cylindrical section 27 circumferentially with the same pitch as the holes 17. The pitch is also referred to as center-angle pitch throughout the invention. Also, the radially inner cylindrical section 27 is formed so that it is comb-toothed.

The coil 24 is formed by winding a conductive wire around a non-magnetic bobbin 29 so that It is annular shaped, and it is located on the inner peripheral side of the radially outer cylindrical section 25 of the stator 23. The electromotive force (emf) generated in this coil 24 is output from a connector 30 that protrudes from the outer surface of the cover 18.

When using the rolling-bearing unit with rpm detection device constructed as described above, as the tone wheel 13 rotates with the hub 1, the density of the magnetic flux flowing in the stator 23, which is faced to the tone wheel 13, changes, so that the voltage generated in the aforementioned coil 24 changes at a frequency that is proportional to the rpm of the hub 1, The theory behind the change of voltage generated in the coil 24 due to the change in density of the magnetic flux flowing in the stator 23 is the same as that applied for rpm sensors that have been widely used in the past. The reason that the density of the magnetic flux flowing in the estator 23 changes due to the rotation of the tone wheel 13 is described below.

The holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column sections located between each pair of adjacent holes 17 and the magnetic tongue-shaped sections located between each pair of adjacent notches 28 are faced to each other through a very small gap 25. When the magnetic column sections and tongue-shaped sections are faced to each other, the density of the magnetic flux flowing between the tone wheel 13 and the stator 23 is high.

In contrast to this state, when the holes 17 and notches 28 are half out of phase, the density of the magnetic flux flowing between the tone wheel 13 and the stator 23 becomes low. In other words, in this state, the holes 17 formed around the tone wheel 13 are faced to the tongue-shaped sections, while at the same time, the notches 28 formed around the stator 23 are faced to the column sections. When the column sections are faced to the notches 28 and the tongue-shaped sections are faced to the holes 17, there is a comparatively large gap or clearance between the tone wheel 13 and the stator 23 generally in the circumference. In this state, the density of the magnetic flux flowing between the tone wheel 13 and the stator 23 becomes low.

As a result, the voltage generated in the aforementioned coil 24 changes proportionally with the rpm of the hub 1.

By using a sensor 20 like described above, the output voltage generated in the coil 24 changes with a frequency proportional to the rpm of the hub 1, however there is an annular limited space that necessarily exists in the opening end of the outer-ring member 8. It is possible to install this sensor 20 in this annular limited space, and it is possible to make the output of the sensor 20 sufficiently large enough to reliably detect the rpm of the rotating hub 1 rotating together with the vehicle wheel.

The permanent magnet 22, stator 23 and coil 24, which make up the sensor 23 are all formed in a circular shape that entirely surrounds the tone wheel 13. Since the magnetic flux that comes from the permanent magnet 22 flows all the way around the stator 23, the amount of magnetic flux that flows inside the stator 23 can be made sufficiently large enough for this stator 23. Thus the change in voltage in the coil 24, that corresponds to the change in density of the magnetic flux passing through the stator 23, can be made large.

Larger output can be obtained by using the prior art rpm detection device with annular-shaped sensor 20, constructed and used as described above, than by using the prior art rod-shaped sensor.

However, the degree that the output is improved by increasing the size of the permanent magnet 22, stator 23 and coil 24 in the annular sensor 20 is still smaller, therefore improvements are desired that will make it possible to obtain even larger output.

One of the reasons why the output is improved only a little even if the size of the permanent magnet 22, stator 23 and coil 24 is increased, is that the amount of change of magnetic flux flowing in the stator 23 is small. In other words, as mentioned above, during the moment when the holes 17 are faced to the notches 28, a high-density magnetic flux flows in the stator 23, and when the holes 17 and notches 28 are half out of phase, the density of the magnetic flux flowing in the stator 23 becomes low. In the case of the prior art construction, the density of the magnetic flux is changed only by the opposing holes 17 and notches 28. Therefore, even when the holes 17 and the notches 28 are half out of phase, there is still a little magnetic flux that flows in the stator 23. As a result, the amount of change in the density of the magnetic flux is small between moments when the holes 17 and notches 28 are faced to each other and when the holes 17 and the notches 28 are half out of phase, and the increase of the output voltage generated in the coil 24 is small.

SUMMARY OF THE INVENTION

The rolling-bearing unit with rpm detecting device of this invention take into consideration the problems as mentioned above.

The object of this invention is to provide a roller-bearing unit with rpm detector which makes it possible to obtain a large output, thus making it possible to more accurately detect the rpm of the wheel.

In the rolling-bearing unit with rpm detecting device of this invention, there are first and two opposing sections where the sensor is faced to the tone wheel, and the magnetic resistance at these two opposing sections changes at the same time as the rotating ring rotates. These two opposing sections are located in series in the magnetic circuit which includes the stator.

In the rolling-bearing unit with rpm detector of this invention, the magnetic resistance changes simultaneously at two opposing sections as the tone wheel rotates, thus the change in density of the magnetic flux flowing in the stator of the sensor becomes large.

DESCRIPTION OF THE PREFERRED EMBODIMENTS

Figure 1:
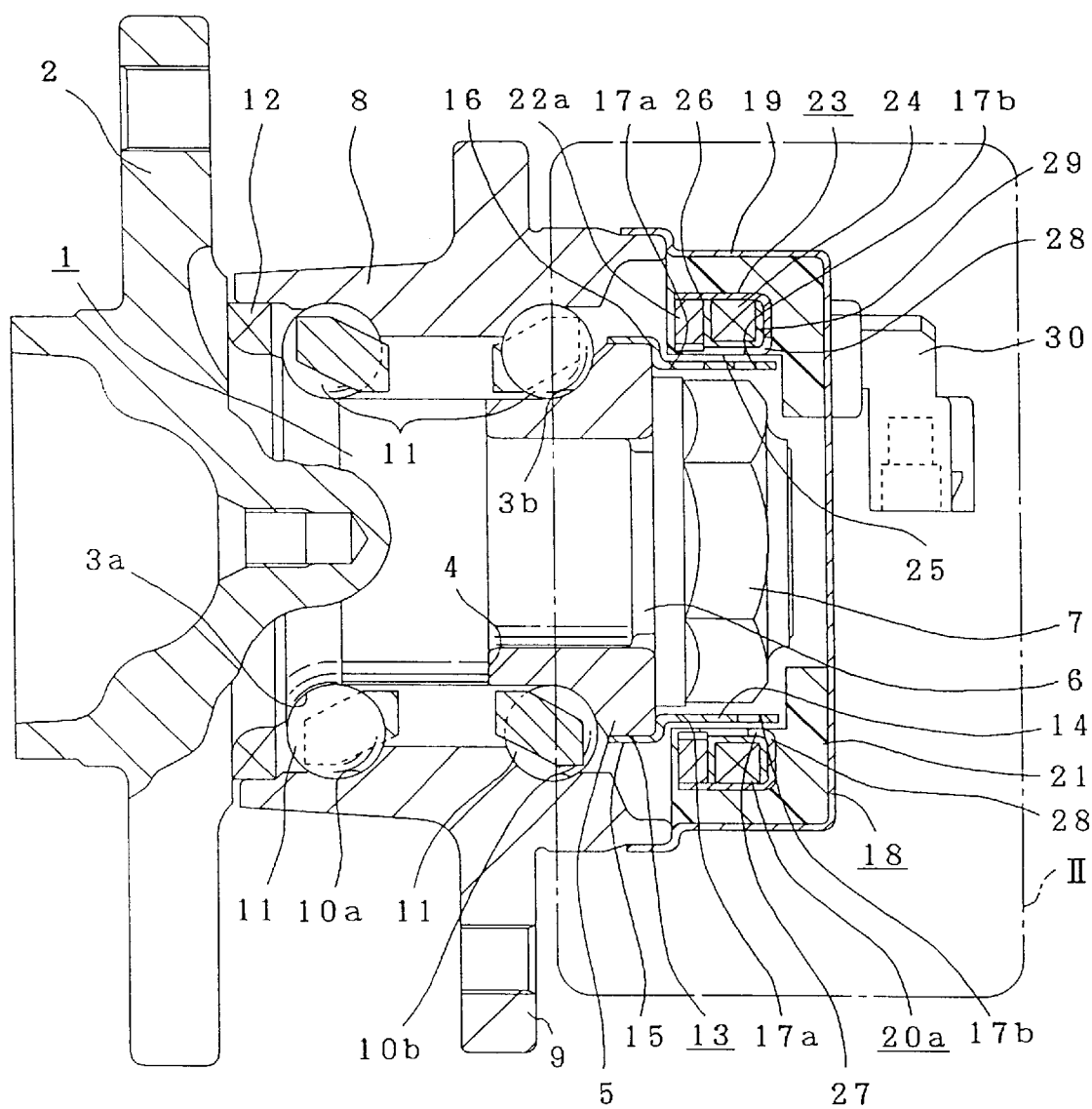
FIG. 1 is a cross-sectional view of a first embodiment of this invention.
Figure 2:
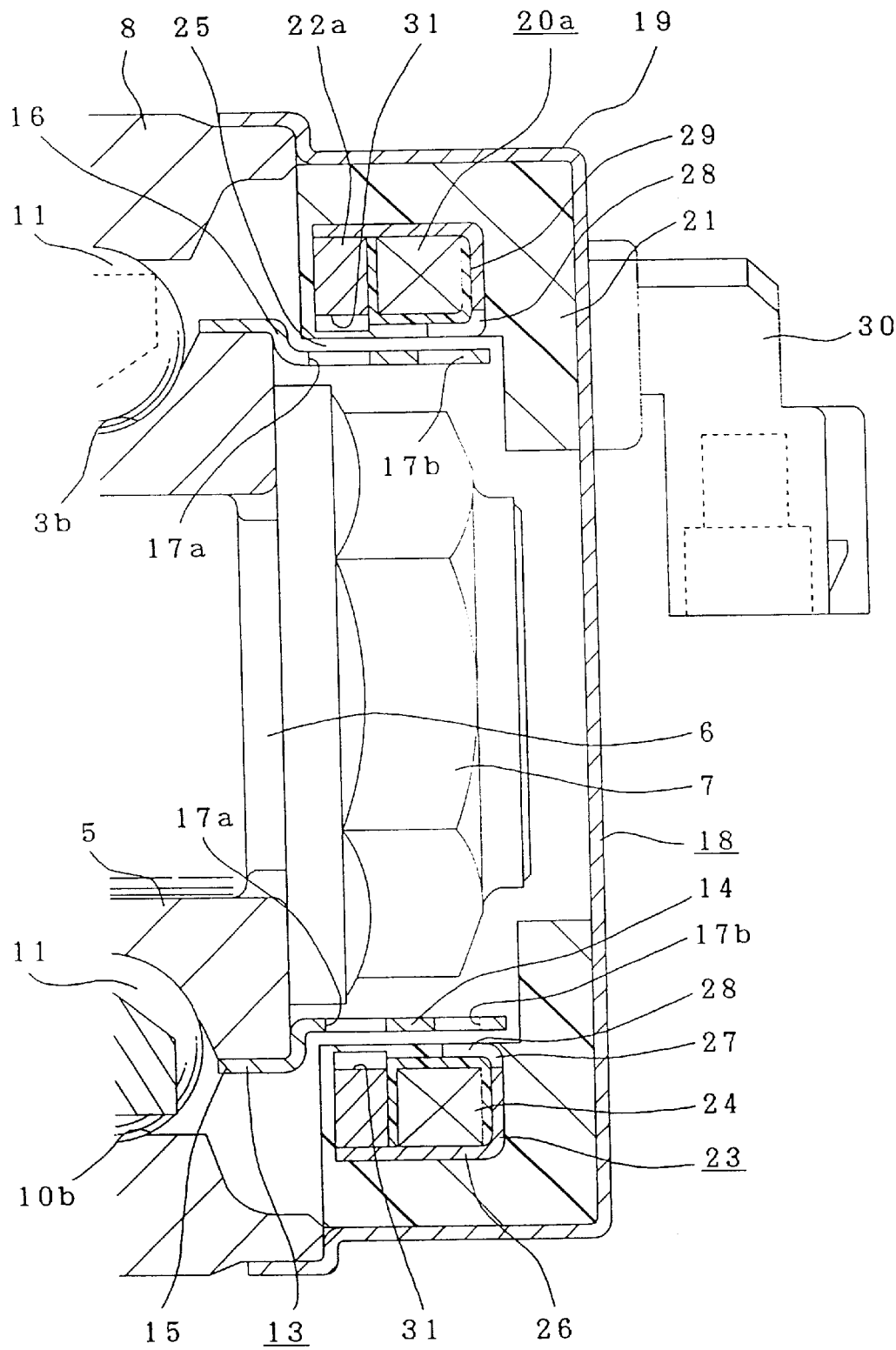
FIG. 2 is an enlargement view of section II of FIG. 1.
Figure 3:
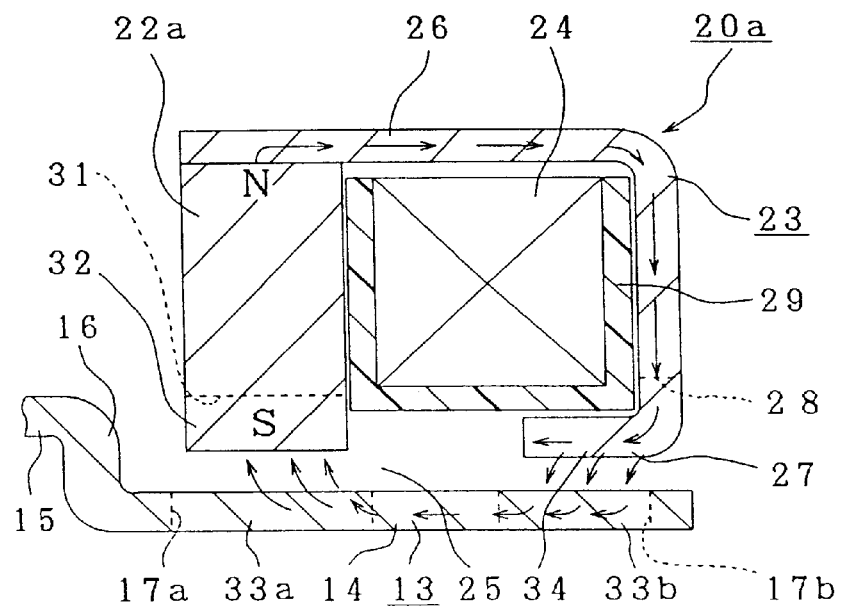
FIG. 3 is a partial enlarged cross-sectional view of the tone wheel and sensor, for explaining the conditions for generating sensor output.
Figure 3:
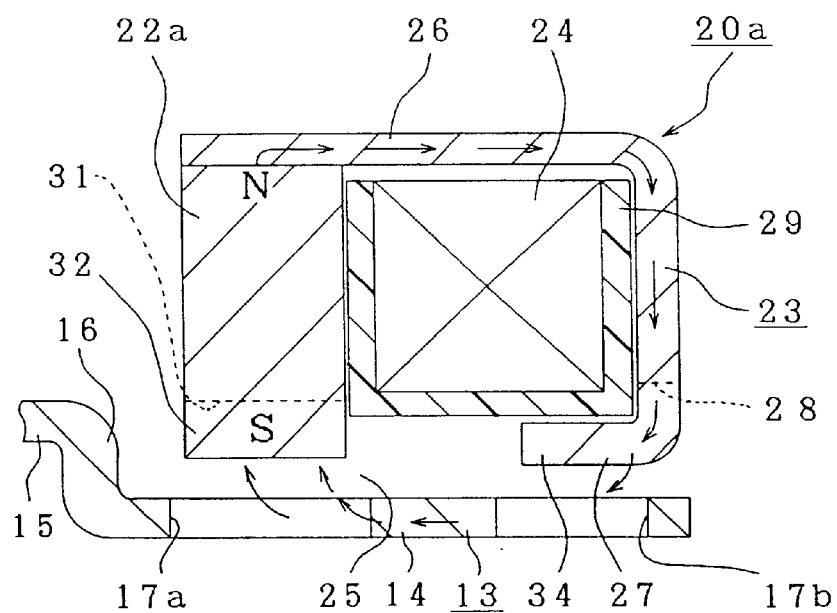

Like the prior art rolling-bearing unit with rpm detecting device described above, the rolling-bearing unit with rpm detecting device of this invention comprises a stationary ring that has a stationary raceway on a first peripheral surface, a cover attached to the end of this stationary ring, a rotating ring that has a rotating raceway on a second surface opposed to the first peripheral surface opposed to the first peripheral surface of the stationary ring, a plurality of rolling bodies that rotate freely between the stationary raceway and the rotating raceway, an annular tone wheel made of magnetic material that is attached to the end of the rotating ring and which has a rotating cutout section having cutouts formed at equal intervals all the way around in the circumferential direction, and an annular sensor that is supported inside the cover so that it is faced to the tone wheel.

In the rolling-bearing unit with rpm detecting device of this invention, there are first and two opposing sections where the sensor is faced to the tone wheel, and the magnetic resistance at these two opposing sections changes at the same time as the rotating ring rotates.

In order to simultaneously change the magnetic resistance at the two opposing sections, for example, in the rolling-bearing unit with rpm detection device in the second aspect, the tone wheel has a rotating cylindrical section that is concentric with the rotating ring and stationary ring, such that a rotating cut-out section is formed around the surface of the rotating cylindrical section. The cutout section has cutouts such as notches or through-holes or recesses in the circumferential direction that generally form an uneven surface.

The sensor comprises a permanent magnet, a stator made of magnetic material and a coil, all of which are circular shaped.

One end face in the magnetic orientation of the permanent magnet is formed with recesses and lands in the circumferential direction, having the same pitch as the cutouts in the rotating cut-out section.

Moreover this and face of the permanent magnet is faced, through a small gap or clearance in a first location, to the rotating cut-out section formed on the rotating cylindrical section of the tone wheel, forming a first opposing section.

One end portion of the stator comes in contact with or comes very close to the other end face in the magnetic orientation of the permanent magnet.

The other end of the stator is formed with a stationary cylindrical section, so that it is concentric with the rotating ring and stationary ring, such that a stationary cut-out section is formed on this stationary cylindrical section having cutouts such as notches or holes or recesses forming an uneven surface. The cutouts have the same pitch as the cutouts in the rotating cut-out section.

This stationary cut-out section is faced, through a small gap or clearance in a second location, to the rotating cut-out section formed around the rotating cylindrical section of the tone wheel, forming a second opposing section.

The recesses around the uneven surface on the one end of the permanent magnet are faced to the cutouts in the rotating cut-out section at the same instant that the cutouts in the stationary cut-out section ore faced to those in the rotating cut-out section.

Furthermore, the coil is located all the way around the midsection of the stator.

Moreover, in the rolling-bearing unit with rpm detection device described in the third aspect, the sensor comprises a pair of circular-shaped permanent magnets that are magnetically oriented in opposite directions and that are concentric with the rotating ring, a stator having the both ends thereof provided in a magnetic conduction relation with one end face in magnetic orientation of this pair of permanent magnets, and a coil which is positioned on the mid-section of the stator between the pair of permanent magnets.

An uneven surface is formed around the other end in magnetic orientation of this pair of permanent magnets and has the same pitch as in the rotating cut-out section, and this other end in magnetic orientation of the pair of permanent magnets is formed such that the different poles are faced to the rotating cut-out section of the tone wheel through a small gap or clearance, forming a pair of opposing sections. Furthermore, the uneven surfaces on the other ends in magnetic or orientation of the permanent magnets are the same as each other in phase with reference to the rotating cut-out section.

In the rolling-bearing unit with rpm detector described in the fourth aspect, the tone wheel has a flange-shaped circular section, and the rotating cut-out section is formed on the surface of this circular section. Moreover, the sensor comprises a circular-shaped permanent magnet, a pair of stators that are made of magnetic material, and a coil.

A stationary cut-out section is formed around one end of each stator with the same pitch as in the rotating cutout section, and the one ends of the stators are faced to the rotating cut-out section formed in the circular section of the tone wheel through a small gap or clearance, forming a pair of opposing sections.

The other end of one of the stators comes in contact with or is vary close to one end face in magnetic orientations of the permanent magnet, while the other end of the other stator comes in contact with or is very close to the other end face of the permanent magnet.

The stationary cut-out section formed on the one end of one of the stators is faced to the rotating cut-out section at the same moment that the stationary cut-out section formed on the one end of the other stator is faced to the rotating cut-out section. Furthermore, the coil is located between the pair of stators generally circumferentially.

The rolling-bearing unit with rpm detector of this invention, constructed as described above, supports the suspension device so that the vehicle wheel can rotate freely, while at the same time detects the rpm of the vehicle wheel in the same manner as the aforementioned prior art rolling-bearing unit with rpm detector. However, in the case of the rolling-bearing unit with rpm detector of this invention, the magnetic resistance changes simultaneously at two opposing sections as the tone wheel rotates, thus the change in density of the magnetic flux flowing in the stator of the sensor becomes large. Also, as the tone wheel rotates, the change in magnetic resistance of this magnetic circuit is large. As a result, the change in density of the magnetic flux flowing in the stator becomes large and the voltage generated in the coil becomes large.

For example, in the case of the rolling-bearing unit with rpm detector described in the second aspect, the magnetic resistance in the section where the rotating cut-out section is faced to the stationary cut-out section changes in the same manner as in the prior art construction. In addition, the magnetic resistance in the section where the uneven surface formed on one end face in magnetic orientation of the permanent magnet is faced to the rotating cut-out section also changes.

These two opposing sections are located in series in the magnetic circuit which includes the stator. Consequently, as the tone wheel rotates, a large change in magnetic resistance of this magnetic circuit is obtained. As a result, the change in density of the magnetic flux flowing in the stator becomes large and the voltage generated in the coil becomes large.

Moreover, in the case of the rolling-bearing unit with rpm detector described in the third aspect, when the lands of the uneven surface around both permanent magnets are faced to the portions between adjacent pairs of cut-outs in the tone wheel, the magnetic resistance between both permanent magnets and the tone wheel becomes small.

As a results, most of the magnetic flux coming from the N-pole of the other end in magnetic orientation of either one of the permanent magnets flows through the tone wheel toward the S-pole on the other end in magnetic orientation of the other permanent magnet. At the same time, most of the magnetic flux flowing from the N-pole of the one end in magnetic orientation of the other permanent magnet flows through the stator toward the S-pole of this end in magnetic orientation of the either one of the permanent magnets.

In this state, the amount of magnetic flux flowing across the coil between this pair of permanent magnets becomes large, and the density of the magnetic flux becomes high.

In contrast to this, when the lands of the uneven surfaces on both permanent magnets are faced to cut-outs in the tone wheel, the magnetic resistance between both permanent magnets and the tone wheel becomes large. As a result, most of the magnetic flux flowing between the pair of end faces in magnetic orientation of the permanent magnets does not pass through the tone wheel and stator, but flows directly between the pair of ends in magnetic orientation of the permanent magnets. In this state, the amount of magnet flux flowing across the coil between the pair of permanent magnets becomes small, and the density of the magnetic flux drops.

Also, as the density of the magnetic flux flowing across the coil changes, voltage is generated in the coil. This voltage changes at a frequency proportional to the rpm of the tone wheel, thus it is possible to know the rpm of the wheel from this frequency.

Furthermore, in the case of the rolling-bearing unit with rpm detector described in the fourth aspect, the magnetic resistance between the edges of the one ends of the pair of stators and the tone wheel changes simultaneously. Also, as the tone wheel rotates, the magnetic resistance in the magnetic circuit changes largely, and the change in density of the magnetic flux flowing in the stators becomes large, so that the output voltage generated in the coil becomes large.

Now, the present invention is more detailed referring to the drawings.

FIGS. 1 thru 4 show a first embodiment of this invention that corresponds to the second aspect. This invention is characterized by construction where, in order to increase the output of the sensor 20a, the magnetic resistance of the magnetic circuit, which includes the stator 23 of the sensor 20a, changes simultaneously at two locations. The other parts and construction are substantially nearly the same as the prior art construction mentioned above, so the like symbols will be used for like parts, and any redundant explanation will be omitted or simplified so that the explanation can be centered on the characteristics of this invention.

The smaller-diameter section or cylindrical section 14 of the tone wheel 13 is concentric with the rotating ring and stationary ring, and comprises a cut-out section formed with through-holes 17a, 17b that are evenly spaced with the same phase all the way around in the circumferential direction. In the embodiment shown in the figures, the holes 17a, 17b are formed in two rows. The reason for this is, that if there were only one row of holes, the holes would be very long with respect to the column width (dimension of the portion between a pair of adjacent holes in the circumferential direction), so the columns could be damaged, deformed or distorted very easily when forming them by using a pressing method.

If the length of the holes is short with respect to the column width, a single row of holes could be formed.

The aforementioned sensor 20a comprises a permanent magnet 22a, a stator 23 made of magnetic material, and a coil 24 that are all circular shaped.

If the holes 17a, 17b are formed in two rows, it is not necessary that the phase of both rows be the same. However, if the phases of both rows do not match, then the phase of the depressions 31 formed around the inner peripheral edge of the permanent magnet, that will be described below, and the phase of the notches 28 formed around the stator 23a must not match in the same way.

It is omitted from the figures, but with respect to the holes 17a, 17b which make up the rotating cut-out sections formed around the tone wheel 13, it is possible to form notches on the axially inner end (right side in FIGS. 1 thru 3) of the tone wheel 13 in the place of the through-holes 17b formed around the axially inner end of the tone wheel 13. In this case, the end of the tone wheel 13 is comb-tooth shaped. If notches are used in the place of holes 17b on the edge of the rotating cut-out section in this way, it is possible to reduce the length in the axial direction of the tone wheel 13. Reducing the length in the axial direction of the tone wheel 13 is not only a useful means for making the rpm detector more compact, but is also effective in suppressing whirling motion of the tone wheel 13.

Figure 4:
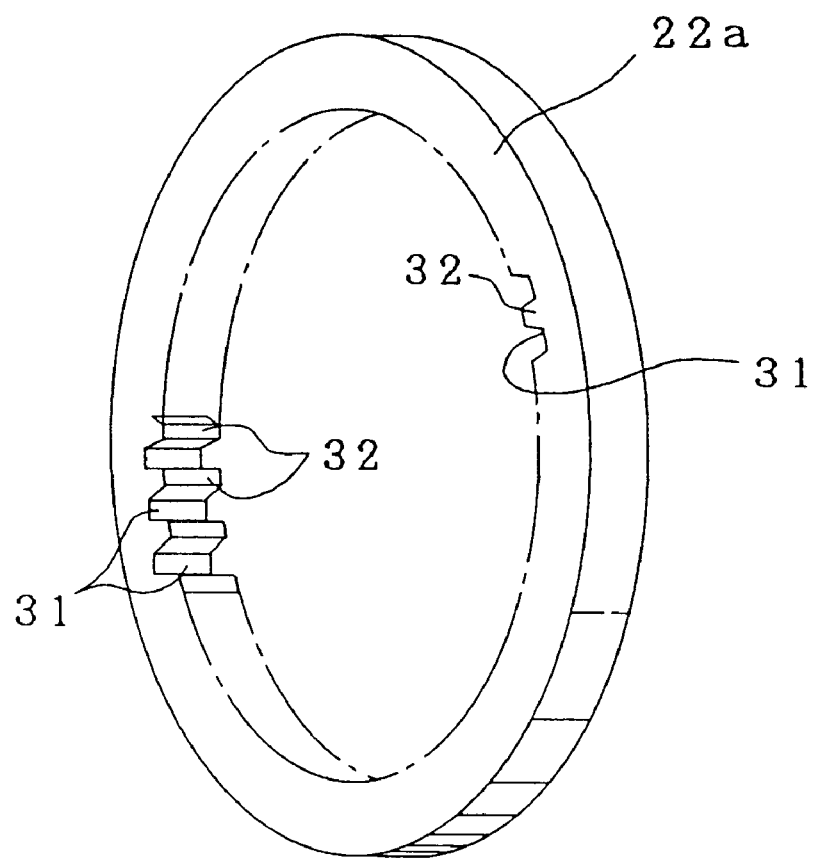
FIG. 4 is a pictorial view of the permanent magnet of the sensor.

The permanent magnet 22a is magnetically oriented in the radial direction all the way around. As shown in FIG. 4, an uneven surface is formed all the way around the inner peripheral surface or one end face in magnetic orientation of the permanent magnet 22a, so that the inner surface of the permanent magnet 22a is tooth shaped (sec FIG. 4).

The pitch of alternating recesses 31 and lands 32 formed around the inner surface of the permanent magnet 22a is the same as the patch of the holes 17a, 17b formed on the smaller-diameter section 14 of the tone wheel 13.

Moreover, the inner peripheral surface of this permanent magnet 22a is faced, through a small gap or clearance 25, to the outer peripheral surface of the smaller-diameter section 14 where the holes 17a, 17b are formed, forming a first opposing section.

Accordingly, at the moment when one of the lands 32 is faced to one of the holes 17a, all of the other lands 32 are faced to the other holes 17a throughout the circumference. In contrast to this, at the moment when one of the recesses 31 is faced to one of the holes 17a, all of the other recesses 31 are faced to the other holes 17a throughout the circumference.

If the permanent magnet 22a is a plastic magnet, the uneven surface on the inner peripheral surface of the permanent magnet 22a can be formed easily using complex shaped dies. Also, the increase in production cost is very small when compared with that of using a simple circular shaped permanent magnet. Moreover, by forming an uneven surface around the inner peripheral surfacer it is possible to alternate the magnetic strength circumferentially in the permanent magnet so that the magnetic strength changes all the way around without using a magnetizing coil that has a very fine pitch and which has a complex shape.

The stator 23 comprises a radially outer cylindrical section 26 and a radially inner cylindrical section 27 connected to each other. One and of the stator 23 is formed on the end of the radially outer cylindrical section 26 which protrudes from the edge of the radially inner cylindrical section 27, and comes in contact with or is very close to the outer surface of the other end of the permanent magnet 22a. Accordingly, the outer peripheral surface of the permanent magnet 22a and the stator 23 are magnetically linked.

Also, the other end of the stator 23 is formed in the stationary, radially inner cylindrical section 27 that is concentric with the rotating ring and stationary ring, and has the stationary cut-out section in which notches 28 are formed.

The pitch of a pair of adjacent notches 28 is the same as the pitch of the aforementioned holes 17a, 17b and as the pitch of the uneven surface formed around the inner peripheral surface of the permanent magnet 22a. This radially inner cylindrical section 27 formed with these notches 28 is faced, through a small gap or clearance 25, to the section on the outer surface of the smaller-diameter section 14 where the holes 17b are formed, thus forming a second opposing section.

Furthermore, the recesses 31 of the uneven surface formed on the inner peripheral surface of the permanent magnet 22a are faced to the holes 17a at the same moment when the notches 26 are faced to the holes 17b. In other words, the phases of the holes 17a, 17b, notches 28, recesses 31 and lands 32 are regulated such that as the tone wheel 13 rotates, all of the recesses 31 are faced to the holes 17a at the same moment when all of the notches 28 are faced to the holes 17b.

Furthermore, the coil 24 of the sensor 20a is nested in the mid-section of the stator 23 between the radially outer cylindrical section 26 and the radially inner cylindrical section 27. This coil 24 comprises a circular-shaped bobbin 29 with a U-shaped cross section made of non-magnetic material such as synthetic resin, and a conductive wire, such as enamel wire, wound around the bobbin 29. The end of this conductive wire pauses through a hole formed in the stator 23 (not shown in the figure) and connects to a terminal on the connector.

In the case of the rolling-bearing unit with rpm detector of this invention, constructed as described above, the magnetic resistance changes simultaneously at two locations (the first and second opposing sections) while the tone wheel 13 rotates, so that the change in density of the magnetic flux flowing in the stator 23 of the sensor 20a is large. In other words, while the magnetic resistance changes at the opposing section where the holes 17b are faced to the notches 28 in the same way an in the prior construction, the magnetic resistance also changes at the opposing section where the uneven surface formed around the Inner surface of the permanent magnet 22a is faced to the holes 17a.

This mechanism is explained in more detail in FIGS. 3(A) and (B). First, as shown in FIG. 3(A), as the tone wheel 13 rotates, all of the lands 32 on the permanent magnet 22a are faced to the column sections 33a between adjacent pairs of holes 17a at the same moment that the tongues 34 between adjacent pairs of notches 28 on the stator 23 is faced to the column section 33b between adjacent pairs of holes 17b. In this state, the magnetic resistance between the tone wheel 13 and the permanent magnet 22a, and the magnetic resistance between the tone wheel 13 and the stator 23 become small. As a result, a large magnetic flux flows in the magnetic circuit which includes the stator 23, and the density of the magnetic flux becomes high.

In contrast to this, as shown in FIG. 3(B), as the tone wheel 13 rotates, all of the lands 32 on the permanent magnet 22a are faced to the holes 17a at the same time that all of the tongues 34 are faced to the holes 17b. In this state, the magnetic resistance between the tone wheel 13 and the permanent magnet 22a, and the magnetic resistance between the tone wheel 13 and the stator 23 become large. As a result, the magnetic flux flowing in the magnetic circuit which includes the stator 23 becomes small, and the density of the magnetic flux becomes low.

Therefore, the magnetic resistance of the magnetic circuit which include the stator 23, changes simultaneously at the two locations which are located in series, and as the tone wheel 13 rotates, the magnetic resistance of this magnetic circuit becomes large. As a result, there is a large change in the density of the magnetic flux flowing in the stator 23, and the output voltage generated in the coil 24 becomes large.

In the embodiment shown in the figures, through-holes 17b are formed on the end of the tone wheel 13 that is faced to the radially cylindrical section 27 of the stator 23, however, it is also possible to form notches on this and of the tone wheel 13 in the place of the through-holes 17b. If notches are used, the edge of the tone wheel 13 becomes comb-tooth shaped. Therefore, by using such notches in the place of holes 17b, it is possible to shorten the dimension of the tone wheel 13 in the axial direction.

Figure 5:
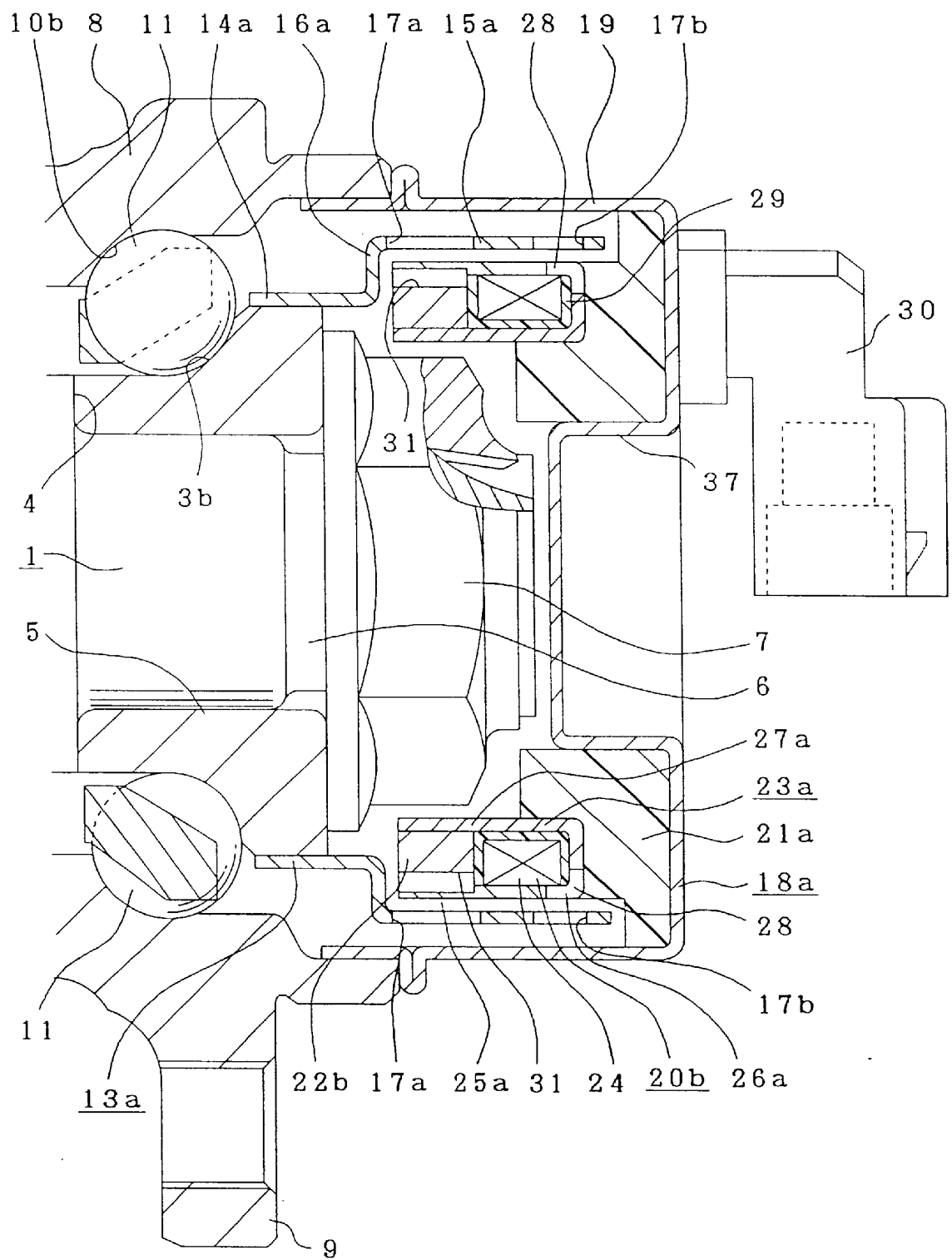
FIG. 5 shows a second embodiment of the invention, similar to as FIG. 2.

Next, FIG. 5 shows a second embodiment of this invention which also corresponds to the second aspect. In this embodiment of the invention, the peripheral speed of the tone wheel 13a is faster, so that the output of the sensor 20b is made even larger. Therefore, the tone wheel 13a used in this embodiment, comprises a smaller-diameter section 14a and a larger-diameter section 15a which are concentric with each other and connected together by a stepped section 16a. The smaller-diameter section 14a of this tone wheel 13a is fitted around the axially inside end portion of the inner-ring member 5, which is away from the inner-ring raceway 3b, so that the tone wheel 13a can rotate freely together with the hub 1. The Larger-diameter section or rotating cylinder section 15a is concentric with the rotating ring or hub 1 and the stationary ring or outer ring member 8. The rotating cut-out section is formed in the larger-diameter section 15a in the shape of holes or notches 17a, 17b at equal intervals all the way around in the circumferential direction.

The sensor 20b comprises a permanent magnet 22b, stator 23a and coil 24 which are all circular or annular shaped. Of these, the permanent magnet 22b is magnetically oriented in the radial direction all the way around Also, an uneven surface that is tooth shaped like a gear is formed on the outer peripheral surface of the permanent magnet 22b, and the one end face in magnetic orientation or outer peripheral surface of this uneven surface of the permanent magnet is faced, through a small gap 25a, to the inner peripheral surface of the larger-diameter section 15a where the holes 17a, 17a are formed.

Moreover, the stator 23a is made of a magnetic material such as low carbon steel plate and has a J-shaped cross section, and has a radially outer cylindrical section 26a and a radially inner cylindrical section 27a that are concentric.

If the stator 23a is made of electromagnetic steel or magnetic pole steel with a high saturation magnetic flux density (this is not limited to this embodiment), the thickness of the stator 23a can be made thin, making it possible to prevent saturation of the flux inside the stator 23a.

With respect to the two cylindrical sections 26a, 27a, the axially outside end of the radially inner cylindrical section 27a protrudes out further in the axial direction than the axially outside end of the radially outer cylindrical section 26a. Also, the outer peripheral surface of the portion of the axially outside end of the radially inner cylindrical section 27a that protrudes out further than the axially outside end of the radially outer cylindrical section 26a comes in contact with or is very close to the inner peripheral surface of the permanent magnet 22b.

Provided around the radially outer cylindrical section 26a, which is the stationary cylindrical section, formed on the other end of the stator 23a, are notches or cutouts 28 having the same pitch as the holes 17b, which form the stationary cut-out section. The outer peripheral surface of this radially outer cylindrical section 26a with notches 28 is faced, through a small gap or clearance 25a, to the inner peripheral surface of the large-diameter section 15a of the tone wheel 13a where the holes 17b are formed. Furthermore, the coil 24 is nested in the mid-section of the stator 23a, and is surrounded by the axially inside surface of the permanent magnet 22b and the inner peripheral surface of the cylindrical section 26a, and the outer peripheral surface of the cylindrical portion 27a.

The sensor 20b, constricted as described above, is embedded in synthetic resin 21a so that it is generally annular or circular shaped and so that it has a hat-shaped cross section. Also, this synthetic resin 21a is attached to the inside of the cover 18a which covers the opening on the axially Inside end of the outer ring member 8. In this state, the inner peripheral surface of the large-diameter section 15a of the tone wheel 13a is faced, through a small gap or clearance 25a, to the outer peripheral surface of the sensor 20b that is supported in the synthetic resin 21a.

As shown in the example in the figure, on the bottom of the cover 18a there is a protruding cylindrical section 37 that has a bottom, and the synthetic resin 21a is fitted on this protruding section 37. Consequently, the supporting strength with which the synthetic resin 21a supports the cover 18a is secured enough.

The roller-bearing unit with rpm detector of this embodiment of the invention, constructed as described above, supports the vehicle wheel so that it rotates free with respect to the suspension device, as well as detects the rpm of the vehicle wheel in the same manner as the rolling-bearing unit with rpm detector described in the first embodiment does, except that the members are placed opposite in the radial directions. As the tone wheel 13a rotates together with the hub 1, the density of the magnetic flux inside the stator 23a which is faced to the tone wheel 13a, changes, and the voltage generated in the coil 24 changes at a frequency that is proportional to the rpm of the hub 1.

In particular, in the case of the tolling-bearing unit with rpm detector of this embodiment, since the inner peripheral surface of the larger-diameter section 15a of the tone wheel 13a is faced to the outer peripheral surface of the radially outer cylindrical section 26a of the stator 23a, it is possible to increase the diameter of larger-diameter section 15a and radially outer cylindrical section 26a. In other words, since the radially outer cylindrical section 26a is located on the outer periphery side of the sensor 20b, whose thickness in the radial direction is somewhat large due to the coil 24 etc., it is possible to increase the diameter of the larger-diameter section 15a and the radially outer cylindrical section 26a. As a result, it is possible to keep an adequate number of holes 17a, 17b and notches 28 in the stationary end rotating cut-out sections, thus increasing the precision of rpm detection. It is also possible to increase the sensor output maintaining the width of the columns 33a, 33b located between adjacent pairs of holes 17a (or holes 17b) and the width of the tongues 34 (see FIG. 3) located between adjacent pairs of notches 28.

Figure 6:
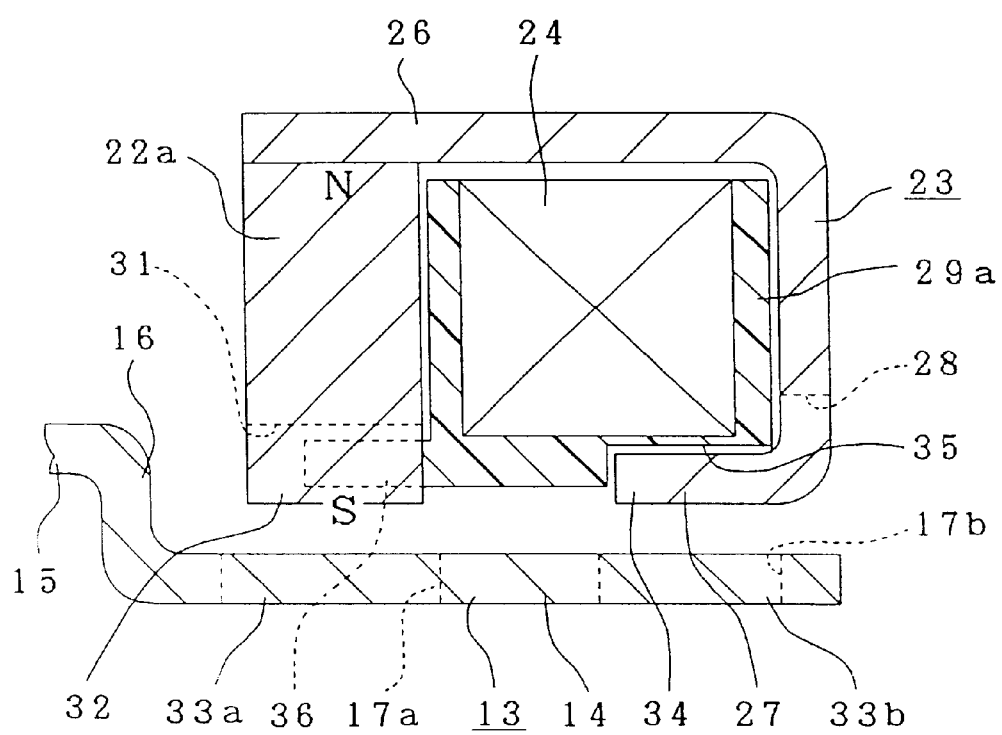
FIG. 6 is a partial enlarged cross-sectional view of the tone wheel and sensor of a third embodiment of the invention.

Next, FIG. 6 shows a third embodiment of the invention that also corresponds to the second aspect. In this embodiment, depressions 35 are formed on the inner surface of the axially inside half of the bobbin 29a so that they are engaged freely with and have the same pitch as the tongues 34 located between adjacent pairs of notches 28. Also, one or more protrusions 36 are formed on the axially outside end face of the bobbin 29a near its inner periphery, and these protrusions 36 are engaged with the recesses 31 on the radially inner surface of the permanent magnet 22a.

In this embodiment, this construction makes it possible to obtain the following two effects in addition to the effects of the first embodiment.

1. The phase of the bobbin 29a with reference to and the permanent magnet 22a is regulated by the engagement between the protrusions 36 and the recesses 31, and the phase of the bobbin 29a with reference to the stator 23 is regulated by the engagement between the tongues 34 and the depressions 35. Also, the phase of the permanent magnet 22a with reference to the stator 23 is regulated, so that the permanent magnet 22a and the stator 23 do not come out of phase when embedded in the synthetic resin.

2. As much as interference between the inner peripheral surface of the bobbin 29a and the tongues 34 is prevented by the depressions 35, it is possible to reduce the inner radius of the bobbin 29a. As a result, the number of windings of coil 24 around the bobbin 29a can be increased, thus increasing the output voltage of the sensor which is generated in the coil 24. Also, by reducing the inner radius of the bobbin 29a, it is possible to increase the total length of conductive wire, while at the same time, keep the magnetic resistance of the coil 24 from increasing, thus effectively increasing the sensor output.

Figure 7:
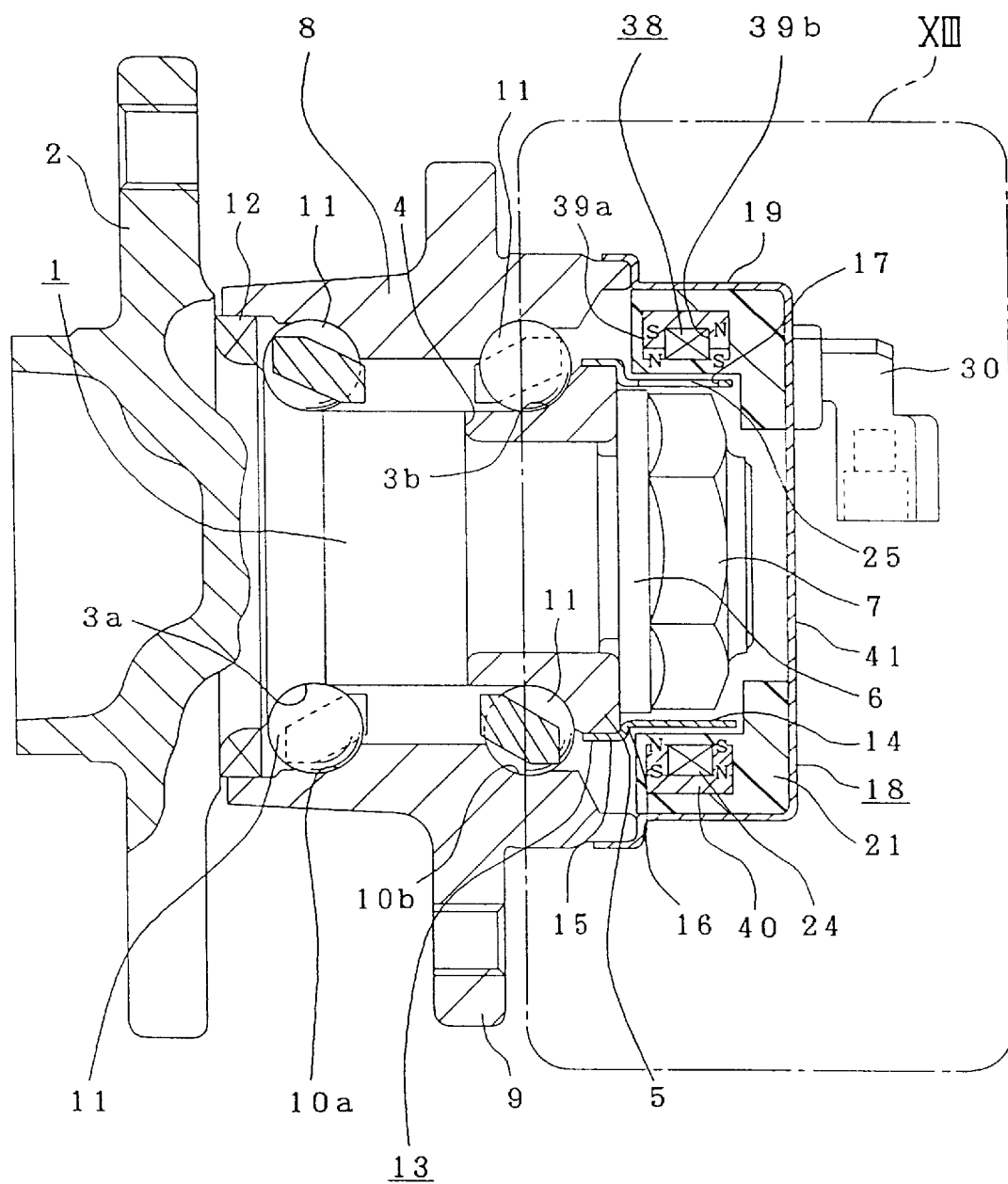
FIG. 7 is a cross-section view of a fourth embodiment of the invention.
Figure 8:
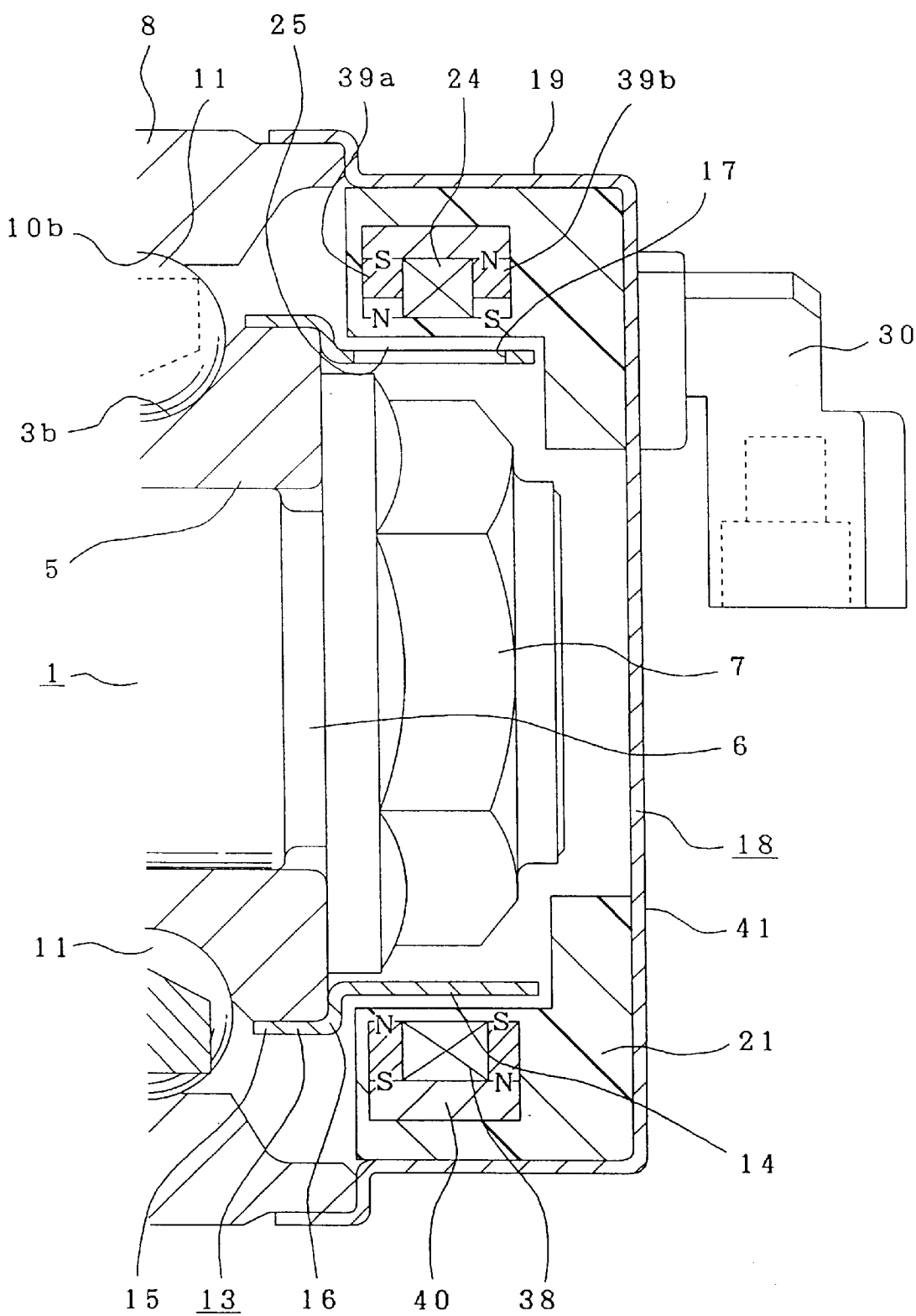
FIG. 8 is an enlarged view of the section VIII of FIG. 7.
Figure 9:
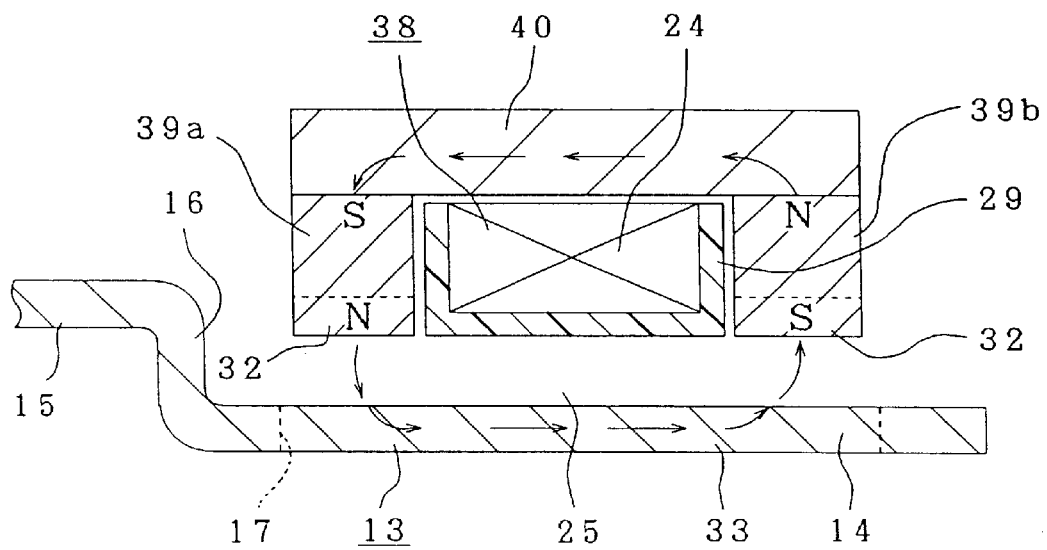
FIG. 9 is a partial enlarged cross-sectional drawing of the tone wheel and sensor, for explaining the conditions for generating sensor output.
Figure 9:
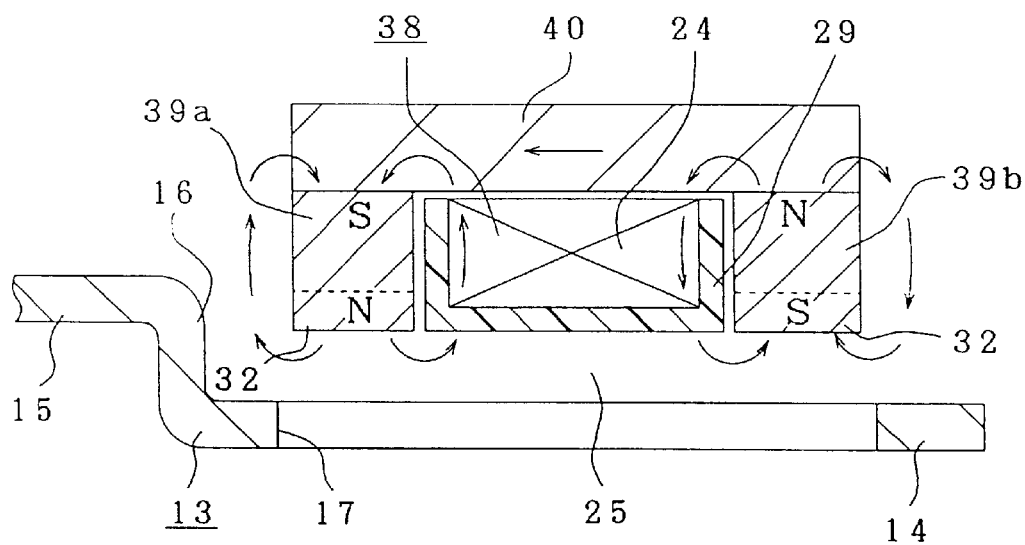

Nest, FIGS. 7 thru 9 show a fourth embodiment of this invention that corresponds to the third aspect. The sensor 38 is secured by being embedded in a synthetic resin mass 21 that is fitted inside the cover 18 which covers the opening on the axially inside end of the outer ring member 8, and comprised of a pair of permanent magnets 39a, 39b that are circular or cylindrical shaped, a stator 40 and a coil 24. Of these, the stator 40 is made of magnetic material such as steel plate and is formed into a cylindrical shape and its thickness is such that it can prevent the magnetic flux from becoming saturated. In order that the stator 40 can be manufactured inexpensively, a piece of magnetic plate can be rounded and formed in a substantially cylindrical shape in a C-shaped cross section.

Also, several recesses and lands are formed circumferentially around the inner peripheral surface of each of the permanent magnets 39a, 39b so that they have the same pitch as the holes 17 formed in the smaller-diameter section 14 of the tone wheel 13. The inner peripheral edge of these permanent magnets 39a, 39b is formed with a gear-like shape in the same as the permanent magnet 22a used in the first embodiment. These permanent magnets 39a, 39b are magnetically oriented in the radial direction. Moreover, the magnetic orientation of these permanent magnets 39a, 39b are opposite of each other.

For example, in the embodiment shown in the figures, the inner peripheral surface of one of the permanent magnets 39a (the left magnet in FIGS. 7 thru 9) and the outer peripheral surface of the other permanent magnet 39b (right magnet in FIGS. 7 thru 9) are the North poles, and the outer peripheral surface of the one permanent magnet 39a and the inner peripheral surface of the other permanent magnet 39b are the South poles. The outer peripheral surface of these permanent magnets 39a, 39b come in contact with or are very close to the inner surface of both ends of the stator 40, so that magnetic conduction occurs between the permanent magnets 39a, 39b and the stator 40. The magnetic orientation may be the opposite of that shown in the figures.

Also, the inner peripheral edges of this pair of permanent magnets 39a, 39b are faced, through a small gap or clearance 25, to portions of the smaller-diameter section 14 of the tone wheel 13 where the both ends of the holes 17 are formed in alignment. The phase of the recesses and lands formed around the inner peripheral edge of these permanent magnets 39a, 39b is the same as that of the holes 17. Accordingly, as shown in FIG. 9(A), at the moment when the lands 32 formed around the inner peripheral edge of the permanent magnets 39a, are faced to the columns 33 located between adjacent pairs of holes 17, the lands 32 formed around the radially inner edge of the other permanent magnet 39b, are faced to the columns 33.

Moreover, as shown in FIG. 9(B), at the moment when the lands 32 formed around the inner peripheral edge of the permanent magnets 39a, are faced to the holes 17, the lands 32 formed around the inner peripheral edge of the other permanent magnet 39b, are faced to the holes 17.

It is not necessary that the through-holes 17 be formed so long that they are faced to the pair of permanent magnets 39a, 39b at the same time, For example, as in the case of the first embodiment described above, if no holes are formed in the section that is faced to the inner peripheral surface of the coil 24, and two rows of short holes are formed in only the portion that is faced to the permanent magnets 39a, 39b, it is possible to prevent deformation of the tone wheel 13 that occurs when forming the holes.

In this embodiment, if long holes are used in the structure where the permanent magnets 39a, 39b are arranged on both ends in the axial direction of the cylindrical-shape coil 24, such that the magnetic resistance is changed at the edge of the permanent magnets 39a, 39b, they must be long enough to correspond to the length in the axial direction of the coil 24, therefore the press equipment required for forming these holes must be large.

In contrast to this, if the holes are arranged In two rows as described above, and the length of each hole is made shorter, it is possible to form the holes by punching them out with smaller (compact and inexpensive) press equipment.

Moreover, if according to the design, one row of holes is to be used, the length of the holes with respect to the width of the columns (width of the portions between adjacent pairs of holes) becomes long, so there is a good possibility that these columns will be bent or distorted when forming the holes with the press. Even in this case, by using two rows of holes, it is possible to maintain the processing precision. As in the case of the first embodiment, if two rows are formed, it is not necessary that the phase of each row be the same.

Furthermore, the aforementioned coil 24 is fitted into the inner peripheral surface of the mid-section of the stator 40 and is surrounded on both sides in the axial direction by the pair of permanent magnets 39a, 39b. In other words, the coil 24 is formed by conductive wires wound around the outer peripheral surface of the bobbin 29, and the entire bobbin 29 is fitted inside the stator 40. Also, part of the conductive wire that makes up the coil 24 runs through a hole or notch that is formed in part of the stator 40, to the outside of the stator 40, and is connected to a terminal on the connector 30 which is formed on the outside of the end plate 41 of the cover 18. The electromotive force that is generated in the coil 24 is output through this connector 30. Also, there is a through-hole formed in the place on the end plate 41 of the cover 18 where the connector 30 is located. A plug or the end of the harness for receiving this signal is inserted into the connector 30. This connector is made of synthetic resin or plastic, through a process first forming a synthetic resin mass in which the sensor 38 is embedded, fitting the synthetic resin mass into the cover 18, and then forming the synthetic resin connector 30 on the outside surface of the cover 18.

When using the rolling-bearing unit with rpm detector of this invention, constructed as described above, as the tone wheel 13 rotates together with the hub 1, voltage is generated in the coil 24 of the sensor 38 that is faced to the smaller-diameter section 14 of the tone wheel 13, and that voltage changes at a frequency that is proportional to the rpm of the tone wheel 13. The reason that voltage is generated in the coil 24 as the tone wheel 13 rotates is described below.

First, as shown in FIG. 9(A), when the lands 32 of the uneven portion formed around the inner peripheral edge of the pair of permanent magnets 39a, 39b are faced to the columns 33 that are located between adjacent pairs of holes 17 on the tone wheel 13, the magnetic resistance between both of the permanent magnets 39a, 39b and the tone wheel 13 becomes small. As a result, most of the magnetic flux that comes from the North pole located on the inner peripheral edge of one of the permanent magnets 39a, flows through the tons wheel 13 toward the South pole located on the inner peripheral edge of the other permanent magnet 39b. At the same time, most of the magnetic flux coming from the North pole located on the outer peripheral edge of the other permanent magnet 39b, flows through the stator 40 toward the South pole, located on the outer edge of the first permanent magnet 39. In this state, the amount of magnetic flux that flows across the coil 24 located between the pair of permanent magnets 39a, 39b, becomes large, and the density of the magnetic flux becomes high.

In contrast to this, as shown in FIG. 9(B), when the lands 32 are faced to the holes 17, the magnetic resistance between both of the permanent magnets 39a, 39b and the tone wheel 13 becomes large. As a result, most of the magnetic flux flowing between both ends in magnetic orientation of the permanent magnets 39a, 39b does not pass through the tone wheel 13 or stator 40, but flows directly between both ends of each of the permanent magnets 39a, 39b. In this state, the amount of magnetic flux flowing across the coil 24 located between the pair of permanent magnets 39a, 39b becomes small, and the density of the magnetic flux becomes low.

In this way, in the sensor 38 of the rolling-bearing unit with rpm detector of this invention, the change in density of the magnetic flux flowing between the pair of permanent magnets 39a, 39b as the tone wheel 13 rotates, is large. As a result, a sufficiently large voltage is generated in the coil 24 located inside the stator 40, and the output of the sensor 38 becomes large.

With the aforementioned sensor 38 functioning as described above, the output voltage generated inside the coil 24 changes at a frequency proportional to the rpm of the hub 1. The sensor 38 can be located in a limited amount of space, and since the output of the sensor 38 made even larger, thus the output of the sensor 38 is stepped up, and the ability to accurately detect the rpm of the vehicle wheel that rotates together with the hub 1 is substantially the same as for each of the embodiments that correspond to the second aspect described above.

Figure 10:
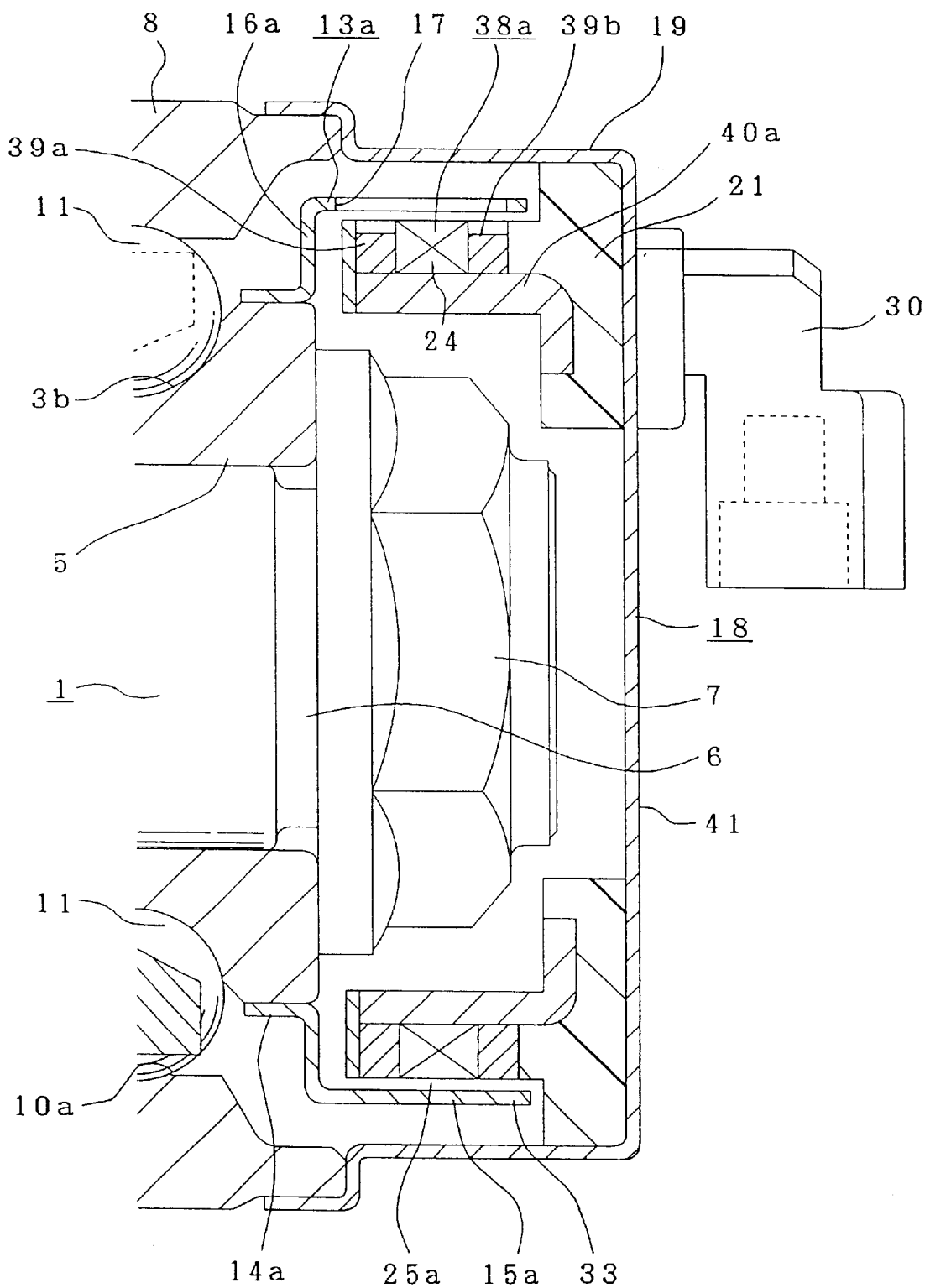
FIG. 10 shows a fifth embodiment of the invention, similar to same as FIG. 2.

Next, FIG. 10 shows a fifth embodiment of this invention that also corresponds to the third aspect. In this embodiment, the tone wheel 13a comprises a smaller-diameter section 14a and a larger-diameter section 15a that are concentric and connected with each other by a step section 16a. The smaller-diameter section 14a is fitted around the portion of the inner ring member 5 that is axially away from the inner-ring raceway 3b. Also, several holes 17 are formed at equal intervals around in the circumferential direction of the larger-diameter section 15a, and the outer peripheral surface of the sensor 38a is faced, through a small gap or clearance 25a, to the inner surface of the large-diameter section 15a.

Also, in this embodiment, an uneven surface of lands and recesses is formed on the outer peripheral edge of a pair of permanent magnets 39a, 39b, and the inner peripheral edges of each of these permanent magnets 39a, 39b come in contact with or are very close to the outer peripheral surface of the stator 40a. In the embodiment shown in the figure, this stator 40a has an L-shaped cross section, and part of the stator 40a sticks out further in the axial direction than the main portion of the sensor 38a (to the right in FIG. 10). The reason for this is that by improving the strength of the bond between the stator 40a and synthetic resin 21 of the sensor 38a, the sensor 38a can be sufficiently held by the synthetic resin 21.

With this kind of construction, it is necessary to keep sufficient distance between the protruding part of the stator 40a and magnetic parts such as the nut 7, in order to prevent leakage of the magnetic flux.

Members made of non-magnetic material that are separate from the stator 40a are located on the inside in the radial direction of the sensor 38a, and by extending these members in the axial directions it is possible to improve the strength of the bond. If this kind of construction is used, there is no leakage of the magnetic flux due to the construction members used for improving the strength, and it is possible to use a magnetic cover 18.

The output of the sensor 38a of this embodiment, constructed as described above, changes as the hub 1 rotates nearly the same as in fourth embodiment described above, except that the radially inner and outer peripheral ends are just opposite. In particular, in the bearing unit with rpm detector of this embodiment, the inner peripheral surface of the larger-diameter section 15a of the tone wheel 13a is faced to the outer peripheral edges of the pair of permanent magnate 39a, 39b, so that the diameter of the rotating cut-out section having the holes 17, and the diameter of the portion on the peripheral edges of the permanent magnets 39a, 39b where the lands and recesses are formed can be made larger. As a result, as in the case of the second embodiment described above, it is possible to have a sufficient number of holes 17 in the rotating cut-out section and lands and recesses in the permanent magnet, thus increasing the precision of detecting the rpm. Also, it is possible to keep the width of the columns 33 located between adjacent pairs of holes 17 large enough, thus making it possible to increase the output of the sensor 38a.

Moreover, the output of this sensor 38a is also improved by speeding up the relative displacement of the holes 17 with respect to the lands and recesses in the permanent magnet by increasing the diameter as described above. It is also possible to use notches or depressions and protrusions in the place of the through-holes 17, shown in the figure, for the cut-out section of the tone wheel.

Figure 11:
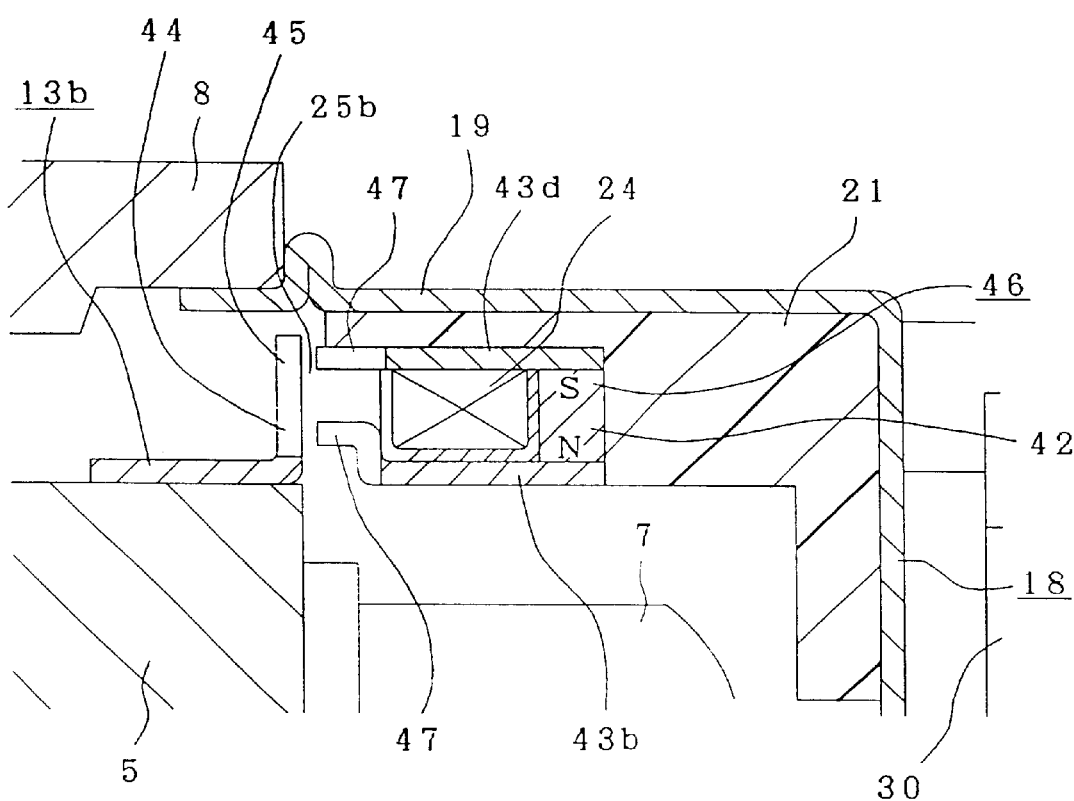
FIG. 11 is a partial enlarged cross-sectional view of a sixth embodiment of the invention.

Next, FIG. 11 shows a sixth embodiment of the invention that corresponds to the fourth aspect. In this embodiment, the tone wheel 13b is fitted around the inner ring member 5, and generally circular or annular and has an L-shaped cross section. Also, this tone wheel 13b comprises a flange-shaped ring section 44 around which is a cut-out section formed with several notches 45 that are spaced at equal interval all the way around in the circumferential direction.

The permanent magnet 42 of the sensor 46 is magnetically oriented in the radial direction. Moreover, both the inner and outer peripheral surfaces of the permanent magnet 42 are simple cylindrical surfaces. Also, a pair of cylindrical stators 43a, 43b are made concentric and have one end (left and in FIG. 11) faced, through a small gap 25b, to the ring section 44, so that this end of the stators 43a, 43b and the side surface of the ring section 44 form one pair of opposing sections.

With respect to these stators 43a, 43b, the inner peripheral surface of the other end (right end in FIG. 11) of the stator 43a located on the outside in the radial direction, comes in contact with or very close to the outer peripheral surface of the permanent magnet 42. Also, the outer peripheral surface of the stator 43b located on the inside in the radial direction, comes in contact with or very close to the inner peripheral surface of the permanent magnet 42.

Moreover, a stationary cut-out section made of notches 47 is formed on the one end of each of the stators 43a, 43b. In other words, there is the same number of these notches 47 as there are notches 45 formed in the tone wheel 13b, and they have the same pitch as same phase all the way around in the circumferential direction. The coil 24 is located between the peripheral surfaces of both of the stators 43a, 43b all the way around.

In this embodiment as well, the density of the magnetic flux flowing in the pair of stators 43a, 43b changes, and the voltage generated in the coil 24 changes at a frequency that is proportional to the rpm of the rotating wheel. Also, as the tone wheel 13b rotates, the magnetic resistance changes simultaneously in the pair of opposing sections, so that the change in density of the magnetic flux flowing in the pair of stators 43a, 43b is large, and it is possible to increase the output of the sensor 46. Moreover, using the construction shown in FIG. 11, by bending the end of at least one of the stators 43a, 43b outward or inward in the radial direction, it is possible to increase the area where the portion formed with notches 47 is faced to the ring section 44. However, if the one end is bent, care must be taken that the end edge of the bent portion does not come too close to the end edge of the other stator. If it is too close, the magnetic flux will flow directly between the pair of stators 43a, 43b, and it will not be possible to detect the rpm.

If the magnetic orientation of the permanent magnet that is built into the sensor is not changed around the circumference of the sensor, as in this invention, it is not only possible to improve the precision of detecting the rpm when compared with construction where the magnetic orientation changes in the circumferential direction, but it is also easier to manufacture the permanent magnet thus making the cost less expensive. The reason that it is possible to improve the precision of detecting the rpm by not changing the magnetic orientation of the permanent magnet in the circumferential direction is explained below.

If the construction is such that the South and North poles alternate in the circumferential direction, it is necessary to keep the magnetic flux that flows directly between adjacent South and North poles and not through the tone wheel small as possible. For example, if the ratio (P/T) of the pitch P of alternating South and North poles in the circumferential direction bald the thickness T of the small gap between the end face in magnetic orientation of the permanent magnet and the tone wheel is made small, a large percent of the magnetic flux flows directly between adjacent North and South poles.

Figure 12:
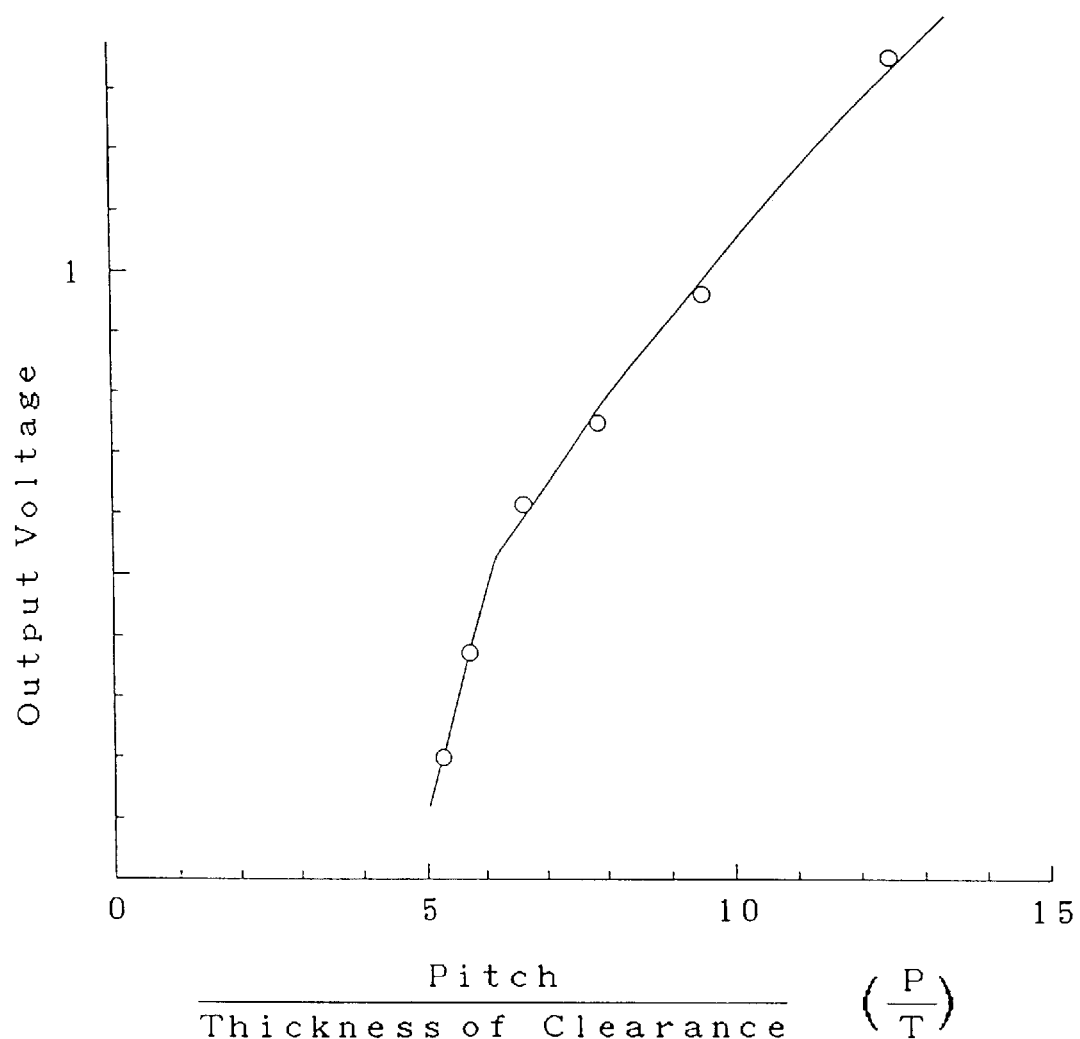
FIG. 12 is a graph showing the effects of the ratio of the pitches of the magnetic poles and cut-out sections and the thickness of the small gap, for an rpm detector with a permanent magnet whose North and South poles alternate in the circumferential direction.

FIG. 12 shows the inventor's test results of the effects of the aforementioned ratio (P/T) on the output voltage when using a permanent magnet whose magnetic orientation changes in the circumferential direction. In FIG. 12, when the output voltage of the sensor is 1.0, the aforementioned ratio (P/T) is 10, and the figure shows the size of the output when this ratio (P/T) is changed. As can be clearly seen from FIG. 12, the output voltage drops suddenly when the ratio (P/T) is 6.5.

The thickness T of the small gap between the end face in magnetic orientation of the permanent magnet and the tone wheel must be at least 0.6 mm. This is to prevent any contact between the sensor and the tone wheel regardless of the elastic deforation of the components that occurs when the roller-bearing unit is operating. Also, the pitch P of alternating South and North poles on the end face in magnetic orientation of the permanent magnet (equal to the pitch of the notches formed on the tone wheel), must be at loss 3.9 mm (0.6 mm×6.5) in order to obtain sufficient output.

If this pitch P is large (3.9 mm or more), it is not possible to have a large number of North and South poles in the circumferential direction, or a large number of notches in the tone wheel. If it is not possible to have a large number of North or South poles and notches, the number of times the output changes per rotation of the wheal becomes small (the interval between output changes becomes large), and it is not possible to accurately detect the rpm at slow speeds. In other words, the precision of the rpm detector becomes low.

In contrast to this, if the construction is such that the magnetic orientation of the permanent magnet does not change in the circumferential direction, most of the magnetic flux flows through the tone wheel even though the pitch of the rotating cut-out section and stationary cut-out section is less than 3.9 mm. As a result, the characteristics differ from those shown In FIG. 12, and even if the pitch of the cut-out sections is less than 3.9 mm, there is no sudden drop in output. Also, it is possible to improve the precision for detecting the rpm by decreasing the pitch of these cut-out sections.

In each of the embodiments of the invention described above, in order to detect the rpm accurately, it is best if the maximum density of the magnetic flux flowing from the and of the permanent magnet and through the stator and tone wheel be at least 1000 Gauss. The reason for this is as follows. The sensor that makes up the rpm detector built into the bearing unit is exposed to constant external magnetic fields and to the residual magnetism of the components of the bearing unit. In order to detect the rpm accurately, it is necessary to make the effect of these external magnetic fields and residual magnetism as small as possible.

The errors in pitch of the notches and holes formed on the rotating and stationary cut-out sections, and the protrusions etc. must be within 1 to 2%. Also, it is best if the effects due to external magnetic fields and residual magnetism be held within 1 to 2% in order to accurately detect the rpm. On regards to this, the normal residual magnetism in the inner ring and outer ring of the bearing unit is about 10 Gauss. Therefore, in order to keep the effects of this residual magnetism within 1%, it is best if the maximum density of the magnetic flux be about 1000 Gauss. For construction where the magnetic orientation of the permanent magnet does not change in the circumferential direction, there is no real problem even if the maximum density of the magnetic flux is 1000 Gauss or more. In contrast to this, for construction where the North and South poles alternate in the circumferential direction, if the maximum density of the magnetic flux is increased, the percentage of the magnetic flux flowing directly between adjacent North and South poles becomes large, and the output of the sensor becomes smaller. From this point as well in order to accurately detect the rpm, it is best if the magnetic orientation of the permanent magnet does not change in the circumferential direction.

Figure 13:
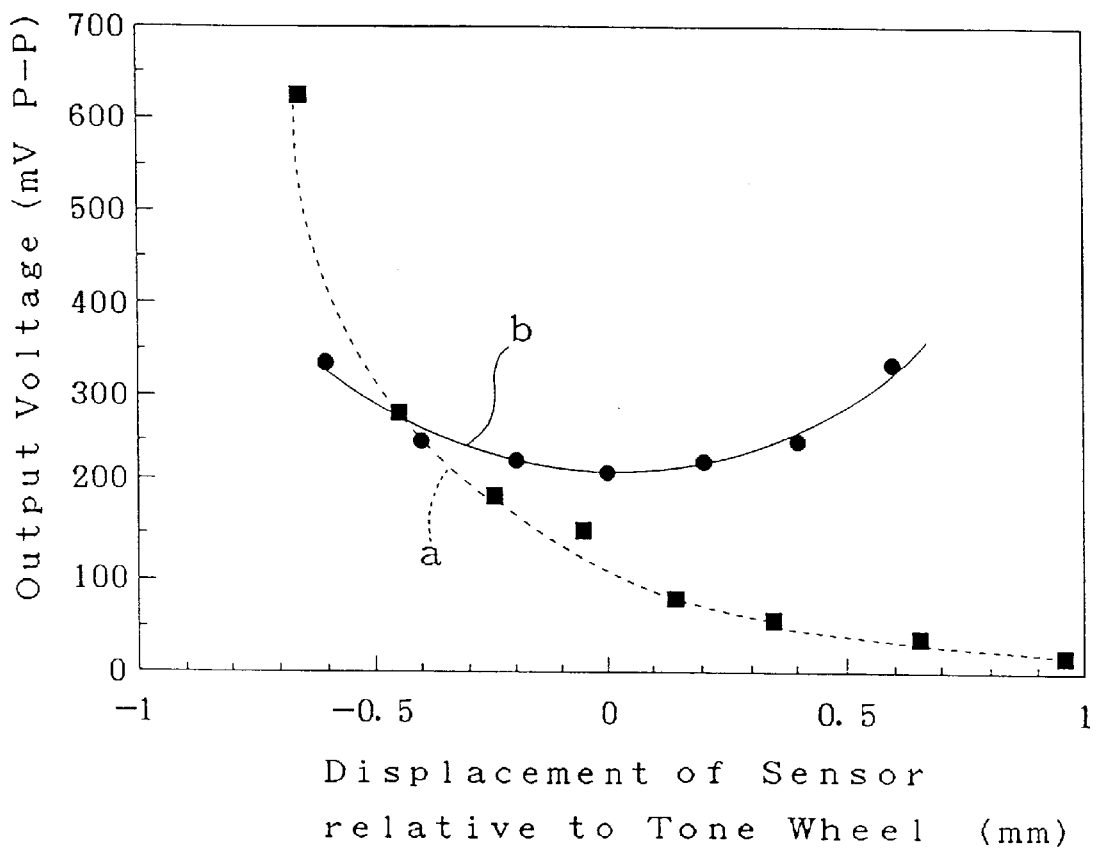
FIG. 13 is a graph showing the effects of the displacement of the sensor in the radial direction on the output of the sensor.
Figure 14:
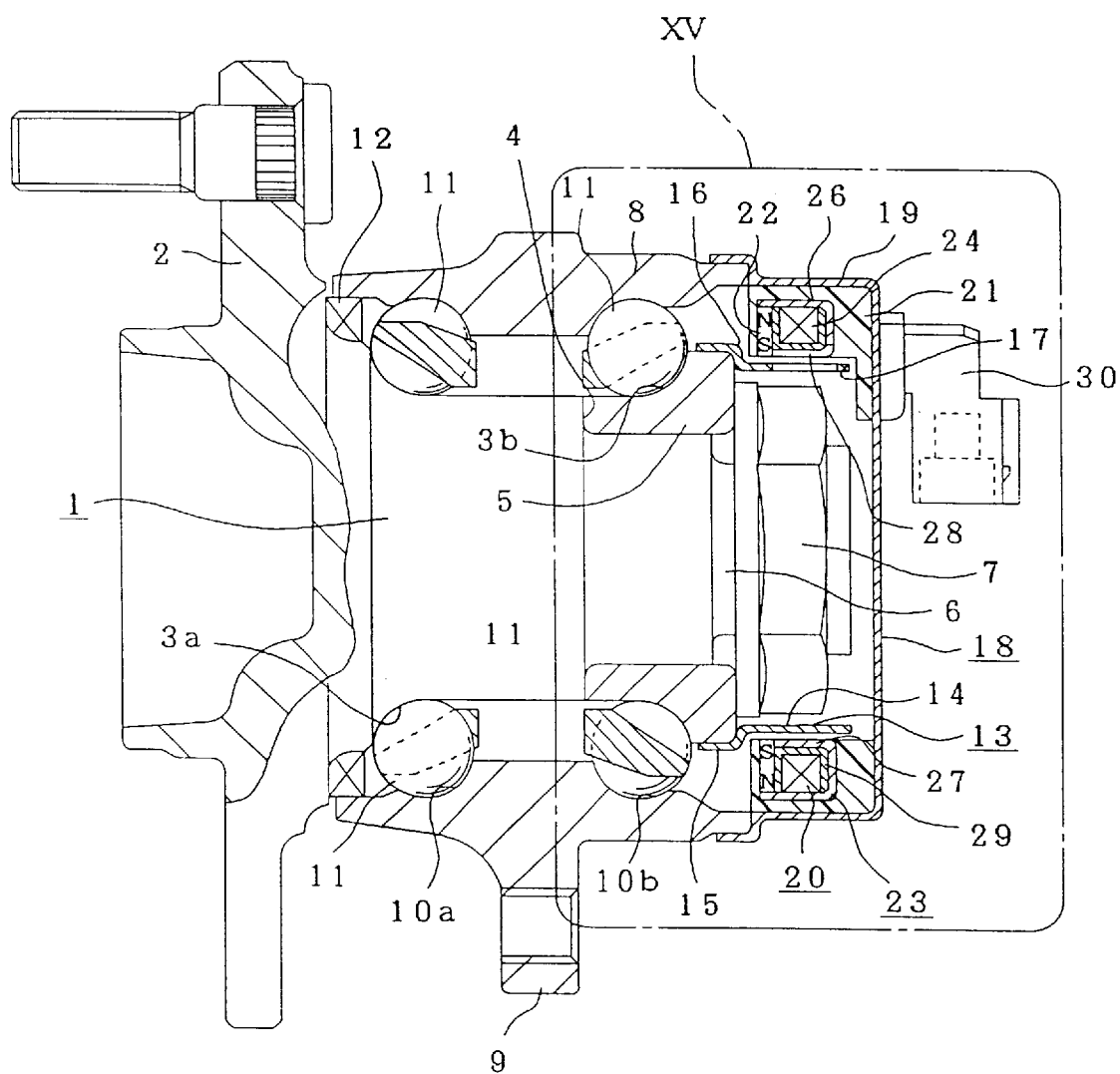
FIG. 14 is a cross-sectional view of an example of prior construction.
Figure 15:
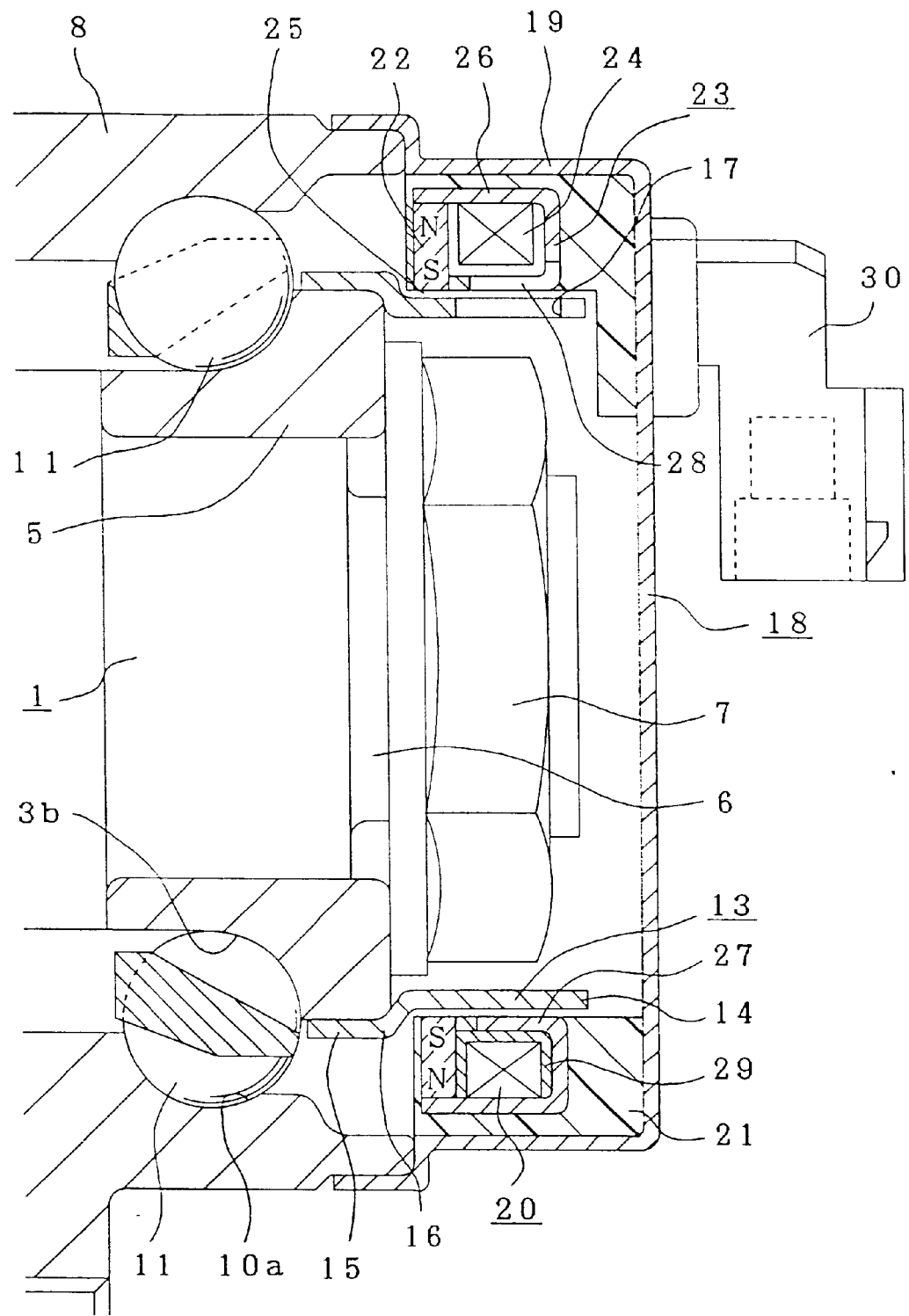
FIG. 15 is a partial enlarged view of section XV of FIG. 14.

Furthermore, in the case of the construction of this invention, where a circular-shaped sensor is used and the peripheral surface of this sensor is generally faced to the peripheral surface of the tone wheel, the output of the sensor is stable regardless of the displacement of the sensor with respect to the tone wheel. In other words, in the prior art construction where the sensor is faced to only one part of the tons wheel, the output of the sensor changed as shown by the dotted line "a" in FIG. 13, due to the displacement of the sensor with respect to the tone wheel. In contrast to this, when an annular or circular-shaped sensor is used, the output of the sensor changes as shown by the solid line "b" of the same figure, due to the displacement of the sensor with respect to the tone wheel. As can be clearly seen from FIG. 13, in the construction of this invention which uses a circular-shaped sensor, it is possible to stabilize the output of the sensor. The reason for this is that when the distance between the peripheral surface of the sensor and the surface of the tone wheel becomes small in one portion it becomes large in another portion, thus there are no large effects on the output of the sensor as a whole.

In all of the embodiments shown in the figures, this invention is applied to the bearing units for supporting the non-driven or free wheels (front wheels for FR cars, and rear wheels for FF cars), and the cover, which supports the sensor, is totally seals the axially inside end. However, this invention is not limited to use with the non-driven wheels, but can also be applied to bearing units for the driven or driving wheels (rear wheels for FR cars and front wheels for FF cars). If this invention is applied to bearing units for driven wheels, the cover is circular shaped and a circular hole is formed in the center through which past of the constant velocity point passes.

Moreover, the hub is cylindrical shaped and a female spline groove is formed on its inner peripheral surface that matches the male spline groove on the outer peripheral surface of the drive the mating member is formed with a recess to receive the projection, or the bobbin has the both ends formed with a recess.

What is claimed is:

1. A rolling-bearing unit with rotation speed detection device comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and an annular sensor that is comprised of a magnet, an annular stator and a coil, and is supported by the cover so as to be faced to the tone wheel, wherein the annular sensor has first and second opposing sections having substantially the same diameter and being radially opposed to the tone wheel, both of the tone wheel and the sensor being formed with lands and recesses circumferentially with a uniform pitch at the first and second opposing portions whereby the magnetic resistance at the first and second opposing sections changes simultaneously as the rotating ring rotates.

2. A rolling-bearing unit with rotation speed detection device comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and an annular sensor that is supported by the cover so as to be faced to the tone wheel, wherein the annular sensor has first and second opposing sections having substantially the same diameter and being radially opposed to the tone wheel, and the magnetic resistance at the first and second opposing sections changes simultaneously as the rotating ring rotates, wherein the tone wheel has a rotating cylindrical section that has a surface and is concentric with the rotating ring and the stationary ring, the rotating cut-out section being formed around the surface of the rotating cylindrical section, the sensor comprising an annular permanent magnet having a magnetic orientation, an annular stator made of magnetic material, and an annular coil, the permanent magnet having two end faces in the magnetic orientation, such that one of the end faces is formed with recesses and lands in the circumferential direction, with the same pitch as in the rotating cut-out section, said one of the end faces of the permanent magnet being faced, through a small gap, to the rotating cut-out section formed on the rotating cylindrical section so as to form said first opposing section, the stator having two end portions, such that one of the end portions comes in contact with or comes very close to the other of the end faces in the magnetic orientation of the permanent magnet, a stationary cylindrical section being formed around the other end portion thereof, so that the stationary cylindrical section is concentric with the rotating ring and the stationary ring, a stationary cut-out section being formed on the stationary cylindrical section and having cutouts with the same pitch as the rotating cut-out section, the stationary cut-out section being faced, through a small gap, to the rotating cut-out section formed around the rotating cylindrical section so as to form said second opposing section, the recesses on the permanent magnet being faced to the cutouts in the rotating cut-out section at the same instant that the cutouts in the stationary cut-out section are faced to the cutouts in the rotating cut-out section, and the stator having a mid-section around which the coil is located all the way.

3. The rolling-bearing unit with of claim 1, wherein the sensor comprises a pair of circular-shaped permanent magnets that are magnetically oriented in opposite directions to have two end faces in magnetic orientation and that are concentric with the rotating ring, a magnetic stator that has ends placed in magnetic conduction with one of the end faces in magnetic orientation of the pair of permanent magnets and a mid-section between the ends, and a coil which is positioned on the mid-section of the stator between the pair of permanent magnets, and the other end in magnetic orientation of the pair of permanent magnets has different poles and formed with recesses and lands with the same pitch as in the rotating cut-out section, which are faced to the rotating cut-out section of the tone wheal through a small gap, so as to form said first and second the opposing sections, such that the recesses and lands formed on the other ends in magnetic orientation of the permanent are the same as each other in phase with reference to the rotating cut-out section.

4. The rolling bearing unit of claim 3, wherein the stator is formed in a cylindrical shape, and has an axial end portion projected axially toward the bottom plate portion of the cover.

5. The rolling bearing unit of claim 1, wherein the pitch of the cutouts in the stationary and rotating cutout sections is up to 3.9 mm.

6. The rolling bearing unit of claim 1, wherein the magnetic flux flowing from one end face in magnetic orientation of the permanent magnet to the stator and tone wheel has a maximum density over 1000 Gauss.

7. The rolling bearing unit of claim 1, wherein the cutouts in the rotating cutout section of the tone wheel are formed in the shape of through-holes or notches by punching press process and in a pair of rows spaced apart in an axial direction.

8. The rolling bearing unit of claim 1, wherein an annular mass of synthetic resin is provided to have the sensor embedded therein and the cover has a bottom plate portion which is formed with a projection in a bottomed cylindrical shape, so that the annular mass of synthetic resin is fitted onto and supported by the projection of the cover.

9. The rolling bearing unit of claim 1, wherein the annular sensor has an annular coil provided between the stators or permanent magnets and comprising an annular bobbin and a conductive wire wound around the bobbin, the bobbin has both ends which are engaged in a concave and convex relationship with the stators or permanent magnets, so that the stators or permanent magnets on the both sides of the coil are controlled in phase.

10. The rolling-bearing unit of claim 1, wherein the tone wheel has a flange-shaped circular section, on the surface of which the rotating cut-out section is formed, the sensor comprises a circular-shaped permanent magnet having two end faces in magnetic orientation, a pair of stators made of magnetic material and having two ends, and a coil, a stationary cut-out section is formed around one of the ends of each stator with the same pitch as in the rotating cutout section, such that the one end of each of the stators is faced to the rotating cut-out section formed in the circular section of the tone wheel through a small gap, so as to form said first and second the opposing sections, the other end of one of the stators comes in contact with or is very close to one of the end faces in magnetic orientation of the permanent magnet, while the other end of the other stator comes in contact with or is very close to the other end face of the permanent magnet, the stationary cut-out section formed on the one end of the stators is faced to the rotating cut-out section at the same moment that the stationary cut-out section formed on the one end of the other stator is faced to the rotating cut-out section, and the coil is located between the pair of stators generally circumferentially.

11. A rolling-bearing unit with rotation speed detection device comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and an annular sensor that is comprised of a magnet, an annular stator and a coil, and is supported by the cover so as to be faced to the tone wheel, wherein the annular sensor has first and second opposing sections having substantially the same diameter and being radially opposed to the tone wheel, each of said first and said second opposing sections having cutouts spaced circumferentially with the same pitch as the rotating cutout section, such that the magnetic resistance at the first and second opposing sections changes simultaneously as the rotating ring rotates.

12. A rolling-bearing unit according to claim 11, wherein at least one of said first and second opposing sections is formed in said magnet.

13. A rolling-bearing unit according to claim 11, wherein said first and second opposing sections are spaced at an axial distance from each other.

14. A rolling-bearing unit according to claim 11, wherein each of said first and second opposing sections are radially opposed to said rotating cutout section.

15. A rolling-bearing unit with rotation speed detection device comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring, and an annular sensor that is comprised of a magnet, an annular stator and a coil, and is supported by the cover so as to be faced to the tone wheel, wherein the annular sensor has first and second opposing sections having substantially the same diameter and being radially opposed to the tone wheel, and the tone wheel and sensor are formed with cutouts circumferentially with a uniform pitch, respectively, at the first and second opposing sections, so that the magnetic resistance at the first and second opposing sections changes at the same frequency as the rotating ring rotates.

16. A rolling-bearing unit according to claim 15, wherein said first and second opposing sections are spaced at an axial distance from each other.

17. A rolling-bearing unit according to claim 15, wherein at least one of said first and second opposing sections is formed in said magnet.

* * * * *